United States Patent
Abbott, Jr. et al.

(10) Patent No.: US 10,875,240 B2
(45) Date of Patent: Dec. 29, 2020

(54) STABILIZING LIQUID FUNCTIONAL MATERIAL FOR THREE-DIMENSIONAL (3D) PRINTING

(71) Applicant: Hewlett-Packard Development Company, L.P., Houston, TX (US)

(72) Inventors: James Elmer Abbott, Jr., Albany, OR (US); Raymond Adamic, Corvallis, OR (US); David A. Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 307 days.

(21) Appl. No.: 15/735,934

(22) PCT Filed: Jul. 24, 2015

(86) PCT No.: PCT/US2015/041955
§ 371 (c)(1),
(2) Date: Dec. 12, 2017

(87) PCT Pub. No.: WO2017/018984
PCT Pub. Date: Feb. 2, 2017

(65) Prior Publication Data
US 2018/0178447 A1    Jun. 28, 2018

(51) Int. Cl.
*B29C 64/165*      (2017.01)
*B33Y 70/00*      (2020.01)
(Continued)

(52) U.S. Cl.
CPC .......... *B29C 64/165* (2017.08); *B22F 3/008* (2013.01); *B28B 1/001* (2013.01); *B33Y 10/00* (2014.12);
(Continued)

(58) Field of Classification Search
CPC .... B29C 64/165; G03G 15/224; B33Y 10/00; B33Y 70/00
See application file for complete search history.

(56) References Cited

U.S. PATENT DOCUMENTS

| 5,204,055 A | 4/1993 | Sachs et al. |
| 5,660,621 A | 8/1997 | Bredt |
(Continued)

FOREIGN PATENT DOCUMENTS

| CN | 1950192 | 4/2007 |
| CN | 1976799 | 6/2007 |
(Continued)

OTHER PUBLICATIONS

Li et al., "Synthesis and Infrared Study of Nanosized Aluminum Nitride Powders Prepared by Direct Current Arc Plasma", J. Phys. Chem. B 1998, 102, 8692-8695 (Year: 1998).*

(Continued)

*Primary Examiner* — Galen H Hauth
(74) *Attorney, Agent, or Firm* — Dierker & Kavanaugh PC

(57) ABSTRACT

A stabilizing liquid functional material (SLFM) for 3D printing includes ceramic nanoparticles in an amount ranging from about 0.25% to about 5% by weight based on a total SLFM weight and silica nanoparticles present in an amount ranging from about 0.1% to about 10% by weight based on the total SLFM weight. The ceramic nanoparticles have a particle size ranging from about 5 nm to about 50 nm. The silica nanoparticles have a particle size ranging from about 10 nm to about 50 nm. The ceramic nanoparticles and the silica nanoparticles are different in composition and/or morphology. An electromagnetic radiation absorber is present in an amount ranging from about 1% to about 10% by weight based on the total SLFM weight. An organic solvent is present in an amount from about 5% to about 50% by weight (Continued)

based on the total SLFM weight. The SLFM includes a balance of water.

13 Claims, 8 Drawing Sheets

(51) Int. Cl.
| | |
|---|---|
| B33Y 10/00 | (2015.01) |
| B33Y 30/00 | (2015.01) |
| B22F 3/00 | (2006.01) |
| G03G 15/22 | (2006.01) |
| B28B 1/00 | (2006.01) |
| C09D 11/037 | (2014.01) |
| C09D 11/101 | (2014.01) |
| C09D 11/322 | (2014.01) |
| C09D 11/52 | (2014.01) |
| B29K 101/12 | (2006.01) |

(52) U.S. Cl.
CPC .............. *B33Y 30/00* (2014.12); *B33Y 70/00* (2014.12); *C09D 11/037* (2013.01); *C09D 11/101* (2013.01); *C09D 11/322* (2013.01); *C09D 11/52* (2013.01); *G03G 15/224* (2013.01); *B22F 2999/00* (2013.01); *B29K 2101/12* (2013.01); *B29K 2995/004* (2013.01); *G03G 15/225* (2013.01)

(56) References Cited

U.S. PATENT DOCUMENTS

| | | | |
|---|---|---|---|
| 6,277,183 B1* | 8/2001 | Johnson | C09D 11/38 106/31.27 |
| 6,537,358 B1 | 3/2003 | Horiuchi | |
| 8,163,077 B2 | 4/2012 | Eron et al. | |
| 8,348,411 B2 | 1/2013 | Brust et al. | |
| 8,784,549 B2 | 7/2014 | Bermel | |
| 8,784,550 B2 | 7/2014 | Kasperchik | |
| 2005/0049739 A1 | 3/2005 | Kramer et al. | |
| 2007/0238056 A1* | 10/2007 | Baumann | B33Y 10/00 430/325 |
| 2007/0241482 A1 | 10/2007 | Giller et al. | |
| 2008/0257204 A1 | 10/2008 | Oriakhi et al. | |
| 2009/0004445 A1 | 1/2009 | Park et al. | |
| 2009/0163615 A1 | 6/2009 | Halahmi et al. | |
| 2012/0247365 A1* | 10/2012 | Lussier | C09D 11/322 106/31.13 |
| 2013/0026683 A1 | 1/2013 | Ng et al. | |
| 2013/0160672 A1 | 6/2013 | Kasperchik | |
| 2013/0284050 A1 | 10/2013 | Adamic et al. | |
| 2014/0036455 A1* | 2/2014 | Napadensky | H05K 1/16 361/748 |
| 2015/0035209 A1 | 2/2015 | Shah et al. | |
| 2015/0069649 A1* | 3/2015 | Bai | B28B 1/001 264/129 |
| 2015/0152239 A1* | 6/2015 | Guilera Grandes | B82Y 30/00 524/377 |

FOREIGN PATENT DOCUMENTS

| | | |
|---|---|---|
| EP | 1498277 | 1/2005 |
| EP | 3200980 | 8/2017 |
| WO | WO-2009/017648 | 2/2009 |
| WO | WO-2014/068579 | 5/2014 |
| WO | WO-2015-108543 | 7/2015 |
| WO | WO-2016053305 A1 | 4/2016 |

OTHER PUBLICATIONS

Son et al., "Spreading of inkjet droplet of non-Newtonian fluid on solid surface with controlled contact angle at low Weber and Reynolds numbers", Journal of Non-Newtonian Fluid Mechanics 162 (2009) p. 78-87 (Year: 2009).*

* cited by examiner

STABILIZING LIQUID FUNCTIONAL MATERIAL FOR THREE- DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A-2B and 2H-2K are cross-sectional views depicting the formation of layer(s) of an example 3D object using still another example of the 3D printing method disclosed herein;

FIGS. 2A-2C and 2F-2G are cross-sectional views depicting the formation of layer(s) of an example 3D object using another example of the 3D printing method disclosed herein;

FIGS. 2A-2B, 2H-2I and 2L-2M are cross-sectional views depicting the formation of layer(s) of an example 3D object using yet another example of the 3D printing method disclosed herein;

DETAILED DESCRIPTION

Figure 1:
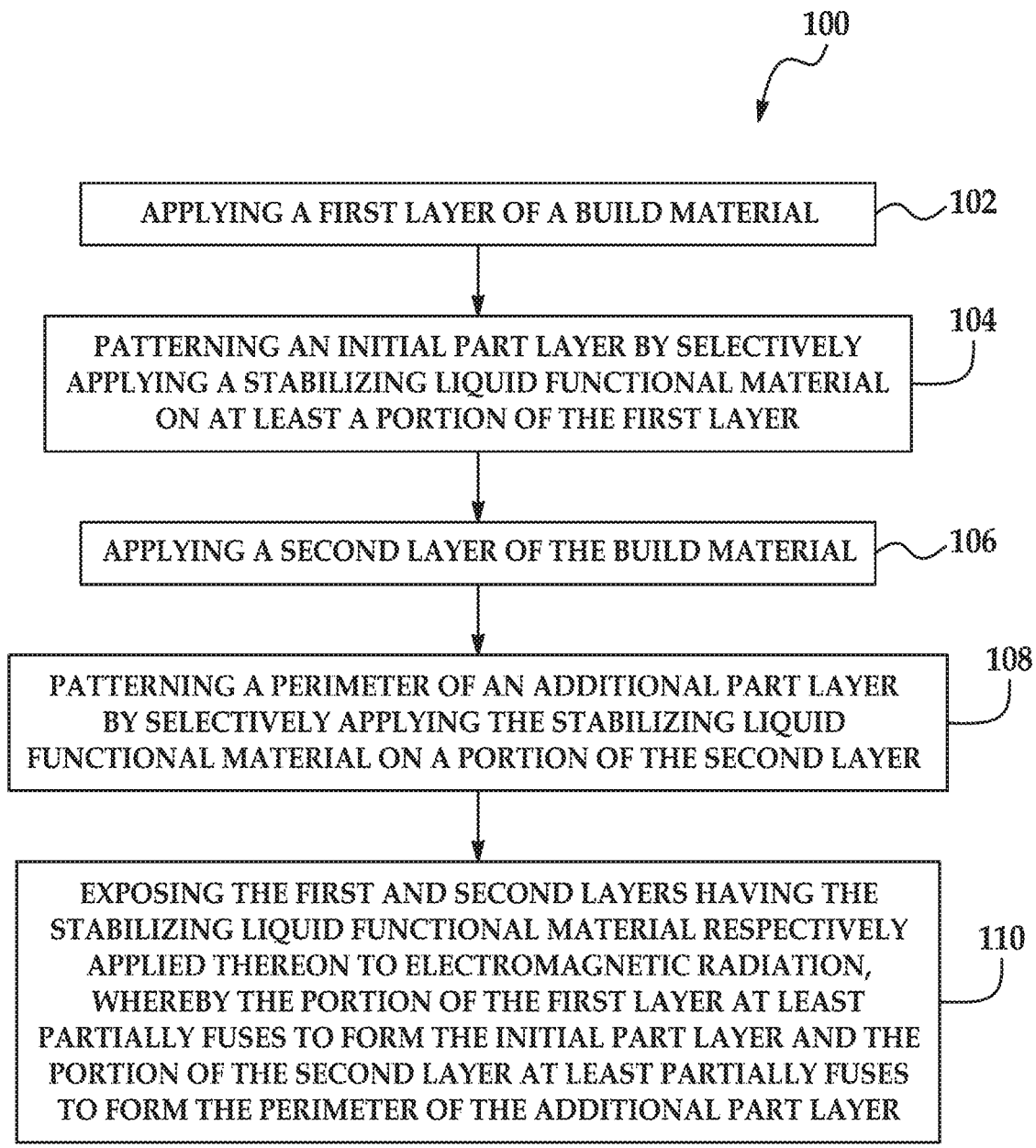
FIG. 1 is a flow diagram illustrating an example of a 3D printing method disclosed herein.

Examples of the three-dimensional (3D) printing method disclosed herein utilize multi jet fusion (MJF). During multi jet fusion, an entire layer or several layers of a build material (also referred to as build material particles) is/are exposed to radiation, but a selected region (in some instances less than the entire layer(s)) of the build material is fused and hardened to become a layer or several layers of a 3D object/part.

Generally, a fusing agent is selectively deposited in contact with the selected region of the build material. The fusing agent(s) is/are capable of penetrating into the layer of the build material and spreading onto the exterior surface of the build material. This fusing agent is capable of absorbing electromagnetic radiation and converting the absorbed radiation to thermal energy, which in turn melts or sinters the build material that is in contact with the fusing agent. This causes the build material to fuse, bind, cure, etc. to form the layer of the 3D object/part.

In some instances, it has been found that the thermal energy may propagate into surrounding build material. This may result in the subsequent solidification of area(s)/portion(s) of the build material that were not intended to be solidified, and this effect is referred to herein as coalescence bleed. Coalescence bleed may result, for example, in a reduction in the overall dimensional accuracy of generated 3D objects. For example, edge acuity may be undesirably rough, undefined, etc.

In the examples of the method disclosed herein, the coalescence bleed may be managed by using a stabilizing liquid functional material, which is capable of absorbing radiation and converting the absorbed radiation to thermal energy. The stabilizing liquid functional material is selectively deposited in contact with selected region(s) of the build material. The stabilizing liquid functional material is capable of locking the build material in the selected region(s) in position. This prevents the stabilizing liquid functional material, or other subsequently deposited liquid functional material(s), from spreading to the surrounding build material outside of where the stabilizing liquid functional material has been deposited. As a result, the stabilizing liquid functional material prevents coalescence bleed by preventing the spread of any radiation absorber present in the liquid functional material(s). A reduction or elimination of coalescence bleed leads to improved or enhanced object/part definition.

Examples of the stabilizing liquid functional material lock the build material in place, and thus reduce the coalescence bleed, due, in part, to the non-Newtonian fluid properties of the stabilizing liquid functional material. The non-Newtonian fluid properties of the stabilizing liquid functional material create a reduced viscosity under sheer or thermal forces when ejected from the printhead. This enables the stabilizing liquid functional material to be printed via an inkjet printer. However, once the stabilizing liquid functional material exits the printhead, the viscosity increases and may form a structured network that prevents migration of radiation absorbers and/or other components within applied liquid functional material(s). This structured network thus enhances part definition.

An example of the 3D printing method 100 is depicted in FIG. 1. It is to be understood that the method 100 shown in FIG. 1 will be discussed in detail herein, and in some instances, FIGS. 2A-2E will be discussed in conjunction with FIG. 1.

As shown at reference numeral 102, the method 100 includes applying a build material. An example of the application of the build material is shown in cross-section at FIG. 2A. In the example shown in FIG. 2A, one layer 10 of the build material 16 has been applied, as will be discussed in more detail below.

The build material 16 may be a powder, a liquid, a paste, or a gel. Examples of the build material 16 include ceramic particles. Examples of suitable ceramic particles include oxides, carbides, and nitrides. Some specific examples include alumina ($Al_2O_3$), glass, silicon mononitride (SiN), silicon dioxide ($SiO_2$), zirconia ($ZrO_2$), titanium dioxide (TiO$_2$), or combinations thereof. As an example, 30 wt % glass may be mixed with 70 wt % alumina. Other examples of the build material 16 include semi-crystalline thermoplastic materials with a wide processing window of greater than 5° C. (i.e., the temperature range between the melting point and the re-crystallization temperature). Some specific examples of the build material 16 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material 16 include polyethylene, polyethylene terephthalate (PET), and an amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

The build material 16 may have a melting point ranging from about 50° C. to about 2100° C. As examples, alumina particles having a melting point of 2072° C. may be used, glass having a melting point ranging from about 200° C. to about 1700° C. may be used, a polyimide having a melting point of 180° C. may be used, or thermal polyurethanes having a melting point ranging from about 100° C. to about 165° C. may be used.

The build material 16 may be made up of similarly sized particles or differently sized particles. In the examples shown herein, the build material 16 includes particles of two different sizes.

The term "size" or "particle size" is used herein to describe at least the build material 16 and ceramic nanoparticles in the stabilizing liquid functional material. The size, particle size, or primary particle size generally refers to the diameter or average diameter, which may vary, depending upon the morphology of the individual particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle. In another example, the respective particle may have a morphology that is fibrous. A fibrous particle is like an elongated particle having a length that is greater than its diameter/particle size. In still another example, the respective particle may have a morphology that is a chain. The chain is made up of individual particles that are aggregated together similar to a string of pearls. The length of the chain is greater than the diameter/particle size of any individual particle in the chain. Still further, the particles may be agglomerated together as a cluster. The cluster may have a secondary particle size, which is the diameter of the agglomeration (not the individual particles in the agglomeration).

In an example, the average size of the particles of the build material 16 ranges from 10 nm to about 100 μm. In another example, the build material 16 is a particle having a particle size ranging from about 1 μm to about 60 μm.

It is to be understood that build material 16 may include, in addition to the ceramic or polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly desirable when the particles of the build material 16 are less than 25 μm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the build material 16.

Figure 2A:
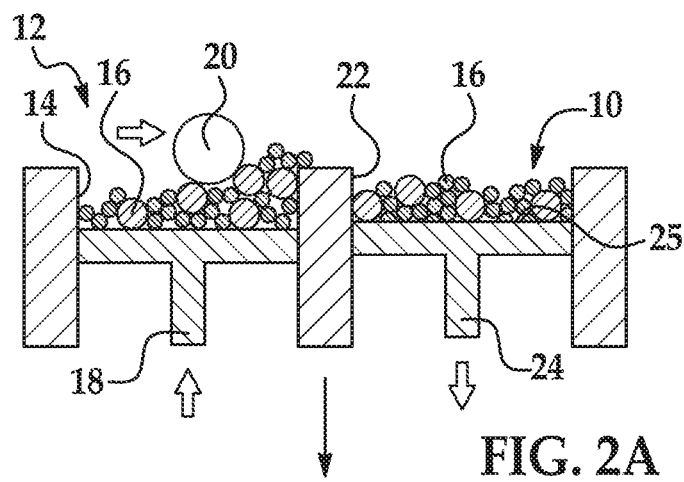
FIGS. 2A-2E are cross-sectional views depicting the formation of layer(s) of an example 3D object using an example of the 3D printing method disclosed herein.

In the example shown in FIG. 2A, a printing system 12 for forming the 3D object/part includes a supply bed 14 (including a supply of the build material 16), a delivery piston 18, a roller 20, a fabrication bed 22 (having a contact surface 25), and a fabrication piston 24. Each of these physical elements may be operatively connected to a central processing unit (not shown) of the printing system 12. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 16, the stabilizing liquid functional material, etc, may be derived from a model of the 3D object to be formed.

The delivery piston 18 and the fabrication piston 24 may be the same type of piston, but are programmed to move in opposite directions. In an example, when a first layer of the 3D object is to be patterned or formed, the delivery piston 18 may be programmed to push a predetermined amount of the build material 16 out of the opening in the supply bed 14 and the fabrication piston 24 may be programmed to move in the opposite direction of the delivery piston 18 in order to increase the depth of the fabrication bed 22. The delivery piston 18 will advance enough so that when the roller 20 pushes the build material 16 into the fabrication bed 22 and onto the contact surface 25, the depth of the fabrication bed 22 is sufficient so that a layer 10 of the build material 16 may be formed in the bed 22. The roller 20 is capable of spreading the build material 16 into the fabrication bed 22 to form the layer 10, which is relatively uniform in thickness. In an example, the thickness of the layer 10 ranges from about 90 μm to about 110 μm, although thinner or thicker layers may also be used. For example, the thickness of the layer 10 may range from about 50 μm to about 1 mm. In an example, the layer 10 thickness ranges from about 100 μm to about 200 μm.

It is to be understood that the roller 20 may be replaced by other tools, such as a blade that may be desirable for spreading different types of powders, or a combination of a roller and a blade.

Figure 2B:
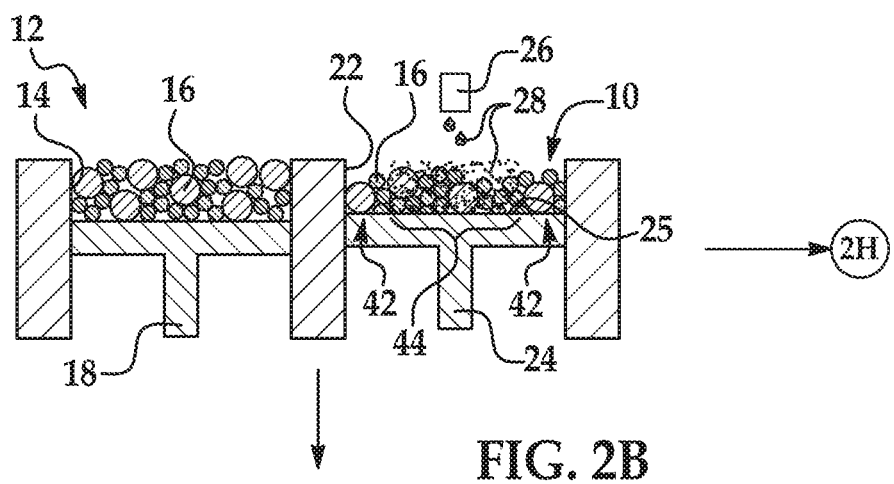

After applying the layer 10 of build material 16, an initial part layer is patterned. The initial part layer is patterned by selectively applying the stabilizing liquid functional material 28 on at least a portion of the build material 16 in the layer 10, as shown at reference number 104 in FIG. 1 and in FIG. 2B. As illustrated in FIG. 2B, the stabilizing liquid functional material 28 may be dispensed from an inkjet printhead 26. While a single printhead 26 is shown in FIG. 2B, it is to be understood that multiple printheads may be used that span the width of the fabrication bed 22. The printhead 26 may be attached to a moving XY stage or a translational carriage (neither of which is shown) that moves the printhead 26 adjacent to the fabrication bed 22 in order to deposit the stabilizing liquid functional material 28 in desirable area(s).

The printhead 26 may be programmed to receive commands from the central processing unit and to deposit the stabilizing liquid functional material 28 according to a pattern of a cross-section for the initial part layer of the 3D object that is to be formed. As used herein, the cross-section of the initial part layer of the object to be formed refers to the cross-section that is parallel to the contact surface 25. In the example shown in FIG. 2B, the printhead 26 selectively applies the stabilizing liquid functional material 28 on those portion(s) of the layer 10 that are to be fused to become the first or initial layer of the 3D object. As an example, if the first layer is to be shaped like a cube or cylinder, the stabilizing liquid functional material 28 will be deposited in a square pattern or a circular pattern (from a top view), respectively, on at least a portion of the layer 10 of the build material 16. In the example shown in FIG. 2B, the stabilizing liquid functional material 28 is deposited in a square pattern on the portion 44 of the layer 10 and not on the portions 42.

The stabilizing liquid functional material 28 enhances the definition of the ultimately formed 3D object by reducing, and in some instances preventing, the migration of liquids (and solid components contained therein) throughout the build material 16 having the stabilizing liquid functional material 28 thereon. The stabilizing liquid functional material 28 impedes the ability of fluid, and particles in the fluid, to move significantly into the portion(s) 44 of the build material layer 10 that has the stabilizing liquid functional material 28 applied thereto. As such, the stabilizing liquid functional material 28 keeps active solid ingredients from moving through build material 16 that is treated with the stabilizing liquid functional material. Additionally, some liquids, such as water, may be able to move through the portion(s) 44 treated with the stabilizing liquid functional material 28, but at a slower rate than when the stabilizing liquid functional material 28 is not present.

As mentioned above, the stabilizing liquid functional material 28 may be a non-Newtonian inkjet ink that has a dynamic viscosity at various shear rates (e.g., viscosity can be measured to indirectly show network formation or aggregation in the ink), a pH relative to the isoelectric point of one of the ink solids (e.g., pH at or above the isoelectric point of one of the ceramic nanoparticles can provide a desirable balance of charge density), and/or a conductivity ranging from about 100 μS/cm to about 2000 μS/cm (which facilitates enhanced stability over inks with higher conductivity).

The present stabilizing liquid functional material 28 can be inkjet printed as the viscosity of the stabilizing liquid functional material 28 can be lowered using shear or thermal forces within an inkjet printhead. Once exiting the printhead, the viscosity of the present stabilizing liquid functional material 28 rapidly increases (e.g. within about 1 second to about 30 seconds) via self-assembly of the structured network within the stabilizing liquid functional material 28. Generally, the structured network within the stabilizing liquid functional material 28 can be assembled through interaction between the first and second ceramic nanoparticles and, in some instances, other charged particles. The first and second ceramic nanoparticles will be described in more detail below.

Regarding viscosity, as discussed herein, the viscosity for non-Newtonian fluids are not discrete but change based on the physical energy applied to the fluid. As used herein, "viscosity" refers to dynamic viscosity unless otherwise stated. For the stabilizing liquid functional material 28, the viscosity can generally be measured at two states: proximate in time to an at rest state; i.e., with a minimum shear applied to the stabilizing liquid functional material 28 (shear rate as low as 5 s$^{-1}$), and proximate in time to a processing state; i.e., with a significant shear applied to the stabilizing liquid functional material 28 (shear rate of at least 10,000 s$^{-1}$ before the firing chamber of the printhead 26, and 500,000 s$^{-1}$ or higher in the firing chamber of the printhead 26). In one example, the stabilizing liquid functional material 28 can have a dynamic viscosity ranging from 5 cps to 10,000 cps at a temperature of 25° C. and a shear rate of 5 s$^{-1}$ and a dynamic viscosity ranging from 1 cps to 100 cps at a shear rate of 10,000 s$^{-1}$ at a temperature of 25° C. In another example, the stabilizing liquid functional material 28 can have a dynamic viscosity of 5 cps to 1,000 cps at shear rate of 5 s$^{-1}$ and is 2 cps to 15 cps at a shear rate of 10,000 s$^{-1}$ at a temperature of 25° C. At an even higher shear rate range (>50,000-500,000 s$^{-1}$ or more) dynamic viscosity of the stabilizing liquid functional material 28 can drop further (e.g., from 1 to 10 cps). As such, high shear rates or other mechanical or thermal forces can enable reliable jetting from inkjet printheads 26. The viscosities can be measured using an Anton Paar Rheometer or a CAP2000 Rheometer from Brookfield Instruments, or an m-VROC™ Viscometer from RheoSense, and can be measured by shearing at room temperature (about 25° C.). Notably, the addition of heat with shear can alter, e.g., lower, the viscosity profiles of the stabilizing liquid functional material 28.

In an example, the pH of the stabilizing liquid functional material 28 can be from 9 to 12. In another example, the pH can be from 9.5 to 11 or from 9.5 to 10.5, giving the first ceramic nanoparticle a negative charge that helps maintain a stable ink with other anionically charged metal or semi-metal species that may be present. Furthermore, the stabilizing liquid functional material 28 can be formulated so that the pH may in some cases drop at or below the isoelectric point of the first ceramic nanoparticle when printed on the build material 16, and thus, the negative charge becomes neutral or even positive. Due to water evaporation, absorption, and/or concentration enrichment, the pH may actually not need to drop much to trigger a strong attraction interaction due to van der Waals interactions. Thus, in some cases, a drop in pH, even if not at or below the isoelectric point of the first ceramic nanoparticle, can still have a positive effect.

In another example, the stabilizing liquid functional material 28 of the present disclosure can be very stable over time, and this stability can be attributed in part to the relatively low conductivity levels. As previously mentioned, the stabilizing liquid functional material 28 can have a conductivity ranging from about 100 micro Siemens per centimeter (µS/cm) to about 2000 µS/cm. Lower conductivities within this range can improve stability on the one hand, but higher concentrations of the first ceramic nanoparticle may improve the charge balance on the other hand, though higher concentrations may also raise the conductivity level within the stabilizing liquid functional material 28. Thus, other more specific ranges of conductivity that can be selected for formulating the stabilizing liquid functional materials 28 of the present disclosure can be from about 100 µS/cm to about 1000 µS/cm or from about 500 µS/cm to about 1000 µS/cm, for example.

As used herein, "structured network" refers to the three dimensional structure formed by the second ceramic particles in the presence of the first ceramic particles via electrostatic interactions and/or physical interactions in the stabilizing liquid functional material 28. The three dimensional structure is dependent upon mechanical and/or thermal forces. The mechanical and/or thermal forces, such as shear energy or heat energy, weaken the structured network resulting in the viscosity changes based on the amount of force applied. In one example, the structured network does not include polymers. However, such an example does not preclude polymers from being present within the stabilizing liquid functional material 28, or even trapped or contained within the structured network. For example, the present stabilizing liquid functional material 28 can further include a polymeric surfactant that does not self-assemble as part of the three dimensional structure but can be present within such a structure.

Regarding the present description as it relates to "non-Newtonian," a non-Newtonian fluid is one which has viscosity dependent on an applied force, such as shear or thermal forces (added thermal). For example, shear thinning fluids decrease in viscosity with increasing rate of shear. The stabilizing liquid functional material 28 of the present application can exhibit these same shear thinning effects, under the fluid ejection conditions in which stabilizing liquid functional material 28 is moved between the fluid container and the printhead of an inkjet device. In another example, thermal thinning fluids decrease in viscosity with increasing rate of heat. The stabilizing liquid functional material 28 of the present disclosure can likewise show these same thermal thinning effects, when the stabilizing liquid functional material 28 is heated during printing, e.g., at the fluid container or at the printhead 26 of an inkjet device.

In another aspect, the energy absorber, e.g., pigments that may be large and dense, in the non-Newtonian liquids show little or no settling in the fluid container or printhead 26 during the times when the stabilizing liquid functional material 28 is not moving through the system or when the stabilizing liquid functional material 28 is not heated. When little or no dynamic pressure is being applied to the stabilizing liquid functional material 28 to move it through the system or when no heat is being applied to the stabilizing liquid functional material 28, the stabilizing liquid functional material 28 has a viscous consistency. However, when the normal amount of dynamic pressure (at least ~10,000 Pascals) is applied to the stabilizing liquid functional material 28 to move it through the inkjet system or when the stabilizing liquid functional material 28 is heated to 50° C. or more, the stabilizing liquid functional material 28 viscosity can change significantly, e.g. from 25 cps to 2 cps. Thus, when such stabilizing liquid functional material 28 is ejected at a high frequency from inkjet dispensing devices, the dynamic viscosities of the stabilizing liquid functional material 28 measured inside the printhead 26 do not interfere with the ejection process of the inkjet system. Generally, during the time when the stabilizing liquid functional material 28 is not moving or being heated, pigment or other particulate settling is either completely prevented or slowed down by several orders of magnitude.

The stabilizing liquid functional material 28 may include a variety of components that contribute to the properties disclosed herein. In an example, the stabilizing liquid functional material 28 includes a first ceramic nanoparticle, a second ceramic nanoparticle that is different than the first ceramic nanoparticle, an electromagnetic radiation absorber, an organic solvent, and a balance of water. In some instances, the stabilizing liquid functional material 28 may include these components and no other components. In other instances, the stabilizing liquid functional material 28 may also include a dispersant and/or a surfactant. Each component will be explained in greater detail below.

The various ranges for the stabilizing liquid functional material 28 may be suitable for forming a thermal inkjet printable material 28. Each of the given ranges may be broader when the material 28 is to be formulated for piezoelectric inkjet printing, in part because the piezoelectric system can tolerate as much as a 50% increase in solids content with respect to the solids content of the thermal inkjet printable material 28. For example, the stabilizing liquid functional material 28 that is printable via a thermal inkjet printer may have a 10% solids content, and the stabilizing liquid functional material 28 that is printable via a piezoelectric inkjet printer may have a 15% solids content.

The stabilizing liquid functional material 28 may include a first ceramic nanoparticle present in an amount ranging from about 0.25% to about 5% by weight based on the total weight of the stabilizing liquid functional material 28. In another example, the first ceramic nanoparticle can be present in an amount ranging from about 0.5% to about 4% by weight, and in yet another example, from about 0.75% to about 2% by weight. Some examples of the first ceramic nanoparticle include substantially spherical or non-spherical silica particles, alumina particles, zinc oxide particles, iron oxide particles (e.g., $Fe_2O_3$), titanium oxide particles (e.g., $TiO_2$), indium oxide particles, zirconium oxide particles (e.g., ZrO), copper oxide particles (e.g., CuO), cobalt oxide particles (e.g., CoO), silver oxide particles ($Ag_2O$), or combinations thereof. In some examples, the alumina particles that are present in the stabilizing liquid functional material 28 may have the formula AlO(OH), and may be diaspore (i.e., α-AlO(OH)) or boehmite (i.e., γ-AlO(OH)). In some other examples, the alumina particles that are present in the stabilizing liquid functional material 28 may have the formula $Al_2O_3$. Still another example of the first ceramic particle is a ceramic mixed with gold particles. The first ceramic nanoparticle may have a particle size ranging from about 5 nm to about 50 nm in diameter. In an example, the first ceramic nanoparticle has a particle size from about 20 nm to about 30 nm.

The stabilizing liquid functional material 28 may also include a second ceramic nanoparticle that is different than the first ceramic nanoparticle. By different, it is meant that the first and second ceramic particles may have different compositions, or that the first and second ceramic particles have the same composition and different morphologies. Any of the first ceramic materials may be used for the second ceramic nanoparticles, as long as the selected nanoparticles are different in composition and/or morphology. Some examples of the second ceramic nanoparticle include discrete, substantially spherical or non-spherical silica particles, fumed silica, fibrous silica, or chain silica. When discrete (i.e., non-aggregated, individual) silica particles are utilized, the primary particle size of each particle ranges from about 10 nm to about 50 nm. In an example, the primary particle size may be about 30 nm. When fibrous silica is utilized, the fibrous silica may have a diameter ranging from about 5 nm to about 50 nm and a length ranging from about 50 nm to about 250 nm. When chain silica is utilized, each particle of the chain may have a diameter ranging from about 5 nm to about 50 nm and the length of the entire chain may range from about 50 nm to about 250 nm.

The second ceramic nanoparticle may be present in an amount ranging from about 0.1% to about 10% by weight based on the total weight of the stabilizing liquid functional material 28. In an example, the second ceramic nanoparticle may be present in an amount of about 1% to 5% by weight. In another example, the second ceramic nanoparticle may be present in an amount ranging from about 0.5% to about 2% by weight.

The inclusion of the first ceramic nanoparticle can contribute to the structure of the stabilizing liquid functional material 28. The structured network forms with the second ceramic nanoparticle being in a presence of the first ceramic nanoparticle co-dispersed in a liquid phase (liquid vehicle which includes an organic solvent and typically water). In one example, when the first ceramic nanoparticle are close to the point of zero charge (i.e., the isoelectric point of the first ceramic nanoparticle used), a strong attraction between particles can occur and the van der Waals interactions increase. This forms a strong attractive potential and can result in a structured network by providing elastic content to a predominantly fluidic system. In another example when the first and second ceramic particles are formed of the same material but have a different morphology (which results in a difference/separation in the charge density of the particles), the structured network refers to the three dimensional structure formed by the ceramic particles via loosely connected, physical interactions. As mentioned, these structured systems show non-Newtonian flow behavior, thus providing useful characteristics for implementation in an inkjet ink because their ability to shear or thermal thin for jetting. Once jetted, this feature allows the jetted drops to become more elastic-, mass-, or gel-like when they strike the build material 16 surface. These characteristics can also provide improved build material 16 attributes, such as the reduction of the penetration of other deposited liquids.

Regarding the stabilizing liquid functional material 28 of the present disclosure, the role of first ceramic nanoparticle can impact both the jettability and the response after jetting. When comparing the stabilizing liquid functional material 28 with a non-Newtonian inkjet ink without the first ceramic nanoparticle but otherwise having an identical formulation, the stabilizing liquid functional material 28 will typically have a higher viscosity over a range of shear rates. In one example, the first ceramic nanoparticle can be added such that its presence in this system is enough to make an appreciable difference in the printing characteristics of the stabilizing liquid functional material 28, but not so much that the stabilizing liquid functional material 28 becomes too low in viscosity.

The first and/or second ceramic nanoparticles may be incorporated into examples of the stabilizing liquid functional material 28 as part of respective aqueous nanoparticle dispersions. As examples, a first aqueous nanoparticle dispersion may include water, the first ceramic nanoparticles, and a dispersant, and a second aqueous nanoparticle dispersion may include water, the second ceramic nanoparticles, and a dispersant.

Examples of suitable dispersants include water-soluble anionic species of low and high molecular weight, such as phosphates and polyphosphates, phosphonates and polyphosphonates, phosphinates and polyphosphinates, carboxylates (such as citric acid or oleic acid), and polycarboxylates (such as acrylates and methacrylates). Other examples include hydrolysable alkoxysilanes with an alkoxy group attached to water-soluble (hydrophilic) moieties, such as water-soluble polyether oligomer chains, phosphate groups or carboxylic groups. In some examples, the dispersant used to disperse first and second ceramic nanoparticles can be a polyether alkoxysilane or polyether phosphate dispersant.

Examples of polyether alkoxysilane dispersants used to dispersed first and second ceramic nanoparticles can be represented by the following general Formula (I):

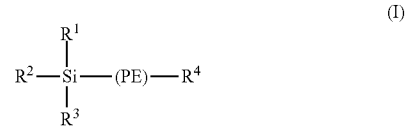

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be $-OCH_3$ and $-OCH_2CH_3$. In some examples, $R^1$, $R^2$ and $R^3$ are linear alkoxy groups having from 1 to 5 carbon atoms. In some other examples, $R^1$, $R^2$ and $R^3$ groups are $-OCH_3$ or $-OC_2H_5$.

b) PE is a polyether oligomer chain segment of the structural formula $[(CH_2)_n-CH(R)-O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment ($-CH_2CH_2-O-$), or polypropylene glycol (PPG) chain segment ($-CH_2-CH(CH_3)-O-$), or a mixture of both types. In some examples, the polyether chain segment (PE) contains PEG units ($-CH_2CH_2-O-$).

c) $R^4$ is hydrogen, or a linear or a branched alkyl group. In some examples, $R^4$ is an alkyl group having from 1 to 5 carbon atoms.

Other examples of dispersants used to disperse the first and second ceramic nanoparticles can include polyether alkoxysilane dispersants having the following general Formula (II):

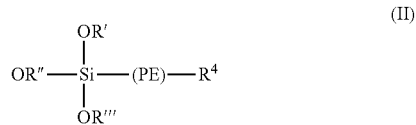

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I): i.e. PE is a polyether oligomer chain segment of the structural formula: $[(CH_2)_n$—CH—R—O$]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the first and/or second ceramic nanoparticles present in the stabilizing liquid functional material 28 are dispersed with polyether alkoxysilanes. Examples of suitable polyether alkoxysilanes include $(CH_3O)_3Si$—$(CH_2CH_2O)_{n'}$ H; $(CH_3CH_2O)_3Si$—$(CH_2CH_2O)_{n'}$ H; $(CH_3O)_3Si$—$(CH_2CH_2O)_{n'}$ $CH_3$; $(CH_3CH_2O)_3Si$—$(CH_2CH_2O)_{n'}$ $CH_3$; $(CH_3O)_3Si$—$(CH_2CH_2O)_{n'}$ $CH_2CH_3$; $(CH_3CH_2O)_3Si$—$(CH_2CH_2O)_{n'}$ $CH_2CH_3$; $(CH_3O)_3Si$—$(CH_2CH(CH_3)O)_{n'}$ H; $(CH_3CH_2O)_3Si$—$(CH_2CH(CH_3)O)_{n'}$ H; $(CH_3O)_3Si$—$(CH_2CH(CH_3)O)_{n'}CH_3$; $(CH_3CH_2O)_3Si$—$(CH_2CH(CH_3)O)_{n'}CH_3$; wherein n' is an integer equal to 2 or greater. In some examples, n' is an integer ranging from 2 to 30 and, in some other examples, n' is an integer ranging from 5 to 15.

Commercially available examples of the polyether alkoxysilane dispersants include SILQUEST®A-1230 manufactured by Momentive Performance Materials and DYNASYLAN® 4144 manufactured by Evonik/Degussa.

The amount of dispersant used in the first and/or second ceramic nanoparticle dispersion may vary from about 1% by weight to about 300% by weight of the first and/or second ceramic nanoparticle content. In some examples, the dispersant content range is between about 2% to about 150% by weight of the first and/or second ceramic nanoparticle content. In some other examples, the dispersant content range is between about 5% to about 100% by weight of the first and/or second ceramic nanoparticle content.

The dispersion of first and/or second ceramic nanoparticles can be prepared via milling or dispersing first and/or second ceramic nanoparticle powder in water in the presence of suitable dispersants. In an example, the first and/or second ceramic nanoparticle dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the first and/or second ceramic nanoparticles. The milling equipment may be a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

In accordance with some examples of the present disclosure, first ceramic nanoparticle and second ceramic nanoparticle co-dispersions as described herein can be useful in that the first ceramic nanoparticle has a charge density that is sensitive to the pH of the stabilizing liquid functional material 28. When the pH of the stabilizing liquid functional material 28 is close to the isoelectric point or point of zero charge of the first ceramic nanoparticle, the amount of charge on the first ceramic nanoparticles is likewise at or near zero. As a result, a desirable balance of charge density and holding this zero charge effect to a minimum can be achieved by utilizing the second nanoparticle dispersion and the relatively low charge density first ceramic nanoparticle dispersion together in the stabilizing liquid functional material 28. The combination of the first and second ceramic nanoparticles results in improved (lower) aqueous phase separation. However, the first ceramic nanoparticle also is included in the stabilizing liquid functional material 28 at a concentration so that it is of a sufficient strength to affect a positive influence on the networking ability of the stabilizing liquid functional material 28 of the present disclosure.

Some examples of commercially available dispersions or powders suitable for use as the first ceramic nanoparticles include DISPERAL® P2 (3 nm to 10 nm boehmite powder, Sasol North America) or gamma $Al_2O_3$ (20 nm to 30 nm alumina dispersion, US Research Nanomaterials, Inc.). The alumina powder is dispersible in water, and shearing may be used to suitably disperse the powder in water. Some examples of commercially available dispersions suitable for use as the second ceramic nanoparticles include ST-30-LH (50 nm colloidal silica dispersion, Nissan Chemical) or SNOWTEX® ST-UP (anisotropic, fiber-like silica dispersion with dimensions of 10 nm to 15 nm by 100 nm to 140 nm, Nissan Chemical). It is to be understood that the particle size may vary depending upon the equipment and technique used to make the dispersion. In an example, the particle size is measured with a dynamic light scattering (DLS) tool from Nanotrac Co.

The stabilizing liquid functional material 28 also includes an organic solvent. The organic solvent may be present in an amount ranging from about 5% to about 50% by weight based on the total weight of the stabilizing liquid functional material 28. In another example, the organic solvent can be present in an amount ranging from 20% to 40% by weight. As used herein, "organic solvent" refers to any organic solvent or mixture thereof. As such, the term organic solvent includes systems of solvents. The present organic solvents are in addition to any water present in the stabilizing liquid functional material 28. Typical organic solvents that can be used include methanol, ethanol, propanol, iso-propanol, a glycol ether having at least about four carbon atoms, C4-C8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-bis(2-hydroxyethyl)-5,5-dimethylhydantoin (DANTOCOL® DHE), 2-methyl-1,3-propanediol (MPdiol), ethylhydroxy-propanediol (EHPD), glycerol, 1,5-pentanedial, 1,2-pentanedial, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the stabilizing liquid functional material 28, measured at any functional shear rate. As used herein, "network non-participating solvent" refers to organic solvents that decrease the viscosity of the stabilizing liquid functional material 28, measured at any functional shear rate. As such, the stabilizing liquid functional material 28 can be altered based on the types of organic solvents used. For example, when the stabilizing liquid functional material 28 includes a network participating solvent, the structured network can be strengthened, e.g., the viscosity of the stabilizing liquid functional material 28 can be increased. However, when a network non-participating solvent is used, the structured network can be weakened, e.g., the viscosity of the stabilizing liquid functional material 28 can be decreased. In one example, network participating solvents can include ethylhydroxypropanediol (EHPD), glycerol, 1,5-pentanediol, ethylene glycol, triethylene glycol, and mixtures thereof. In another example, network non-participating solvents can include 2-pyrrolidinone, 1,2-pentanediol, MPdiol, 1,2-hexanediol, sorbitol, 1-(2-hydroxyethyl)-2-pyrrolidinone, sulfolane, and mixtures thereof. As such, the structured network properties and resultant stabilizing liquid functional material 28 properties can be modified by mixing and matching particular organic solvents. In one example, the organic solvent includes a mixture of a network participating solvent and a network non-participating solvent. Additionally, the stabilizing liquid functional material 28 can contain a significant amount of organic solvent, including network participating solvents and/or network non-participating solvents.

The stabilizing liquid functional material 28 also includes an electromagnetic radiation absorber. In one example, the electromagnetic radiation absorber can be present in the stabilizing liquid functional material 28 in an amount ranging from about 1% to about 10% by weight based on the total weight of the stabilizing liquid functional material 28. In another example, the amount of the electromagnetic radiation absorber may range from about 1% to about 7% by weight. In yet another example, the electromagnetic radiation absorber may be present in an amount of about 4.4% by weight. The electromagnetic radiation absorber may selected to absorb any wavelength in the electromagnetic spectrum. As examples, the electromagnetic radiation absorber may be capable of absorbing IR radiation (i.e., a wavelength of about 700 nm to about 1 mm, which includes near-IR radiation (i.e., a wavelength of 750 nm to 1.4 µm)), ultraviolet radiation (i.e., a wavelength of about 10 nm to about 380 nm), visible radiation (i.e., a wavelength from about 390 nm to about 700 nm), microwave radiation (i.e., a wavelength of about 1 mm to 1 about m), radio radiation (i.e., a wavelength from about 1 m to about 1000 m), or a combination thereof. An example of the electromagnetic radiation absorber may be a susceptor, such as carbon black, graphite, magnetite, and/or various iron oxides. Carbon black may also be used as an IR (including near-IR) radiation absorber. Examples of other suitable radiation absorbers include visible dyes or IR dyes of any suitable color.

The stabilizing liquid functional material 28 also includes a balance of water. As such, the amount of water will depend upon the amounts of the other material 28 components. It is noted that in one specific example, the stabilizing liquid functional material 28 can be an aqueous inkjet ink, comprising a water content from about 30% to about 95% by weight (e.g., the balance of water).

Additionally, the stabilizing liquid functional material 28 can include non-ionic, cationic, and/or anionic surfactants, ranging from about 0.01% by weight to about 4% by weight. The present stabilizing liquid functional material 28 formulations can include other components, such as biocides, viscosity modifiers, materials for pH adjustment, sequestering agents, preservatives, and the like. While some other components may be utilized, examples of the stabilizing liquid functional material 28 exclude a binder (so that the build material 16 does not bond immediately upon application of the stabilizing liquid functional material 28).

The properties of the stabilizing liquid functional material 28, e.g., viscosity, ink efficiency, etc., can be affected by a number of variables including the type of the second ceramic nanoparticle used (e.g., spherical, colloidally synthesized or grown, chain, etc.), the type of solvents, the amounts of these components, pH, ionic strength, etc.

In an example of a manufacturing method, the nanoparticle dispersion(s) can be prepared and then added to the other components (e.g., co-solvent, radiation absorber, water) to form the stabilizing liquid functional material 28. In another example, the method of manufacturing the stabilizing liquid functional material 28 can include dispersing the second ceramic nanoparticles in an aqueous liquid vehicle; dispersing the first ceramic nanoparticles in the aqueous liquid vehicle; and adding an organic solvent and an electromagnetic radiation absorber to the aqueous liquid vehicle.

Regarding the method of manufacturing the stabilizing liquid functional material 28, it is to be understood that the steps can be performed in a number of sequences and are not intended to be limited to require any particular sequence. For example, the adding of the organic solvent can be before mixing of the first ceramic nanoparticles, and vice versa. Additionally, it is noted that any and all combinations of such steps or individual step may be performed sequentially or simultaneously. For example, the mixing of the first ceramic nanoparticles and the adding of the organic solvent may be performed sequentially or may be performed simultaneously.

The stabilizing liquid functional material 28 may be used in conjunction with multiple imaging systems, examples of which include thermal or piezo inkjet, electrostatic, liquid electrophotographic printing (LEP), etc. In an example, the stabilizing liquid functional material 28 is loaded in the inkjet print cartridge 26. The inkjet print cartridge 26 can be adapted for shearing the stabilizing liquid functional material 28 within the printhead 26 at a shear rate of 10,000 s$^{-1}$ or more (e.g., 500,000 s$^{-1}$ or more in the firing chamber) to provide a dynamic viscosity ranging from 2 cps to 100 cps.

Figure 2C:
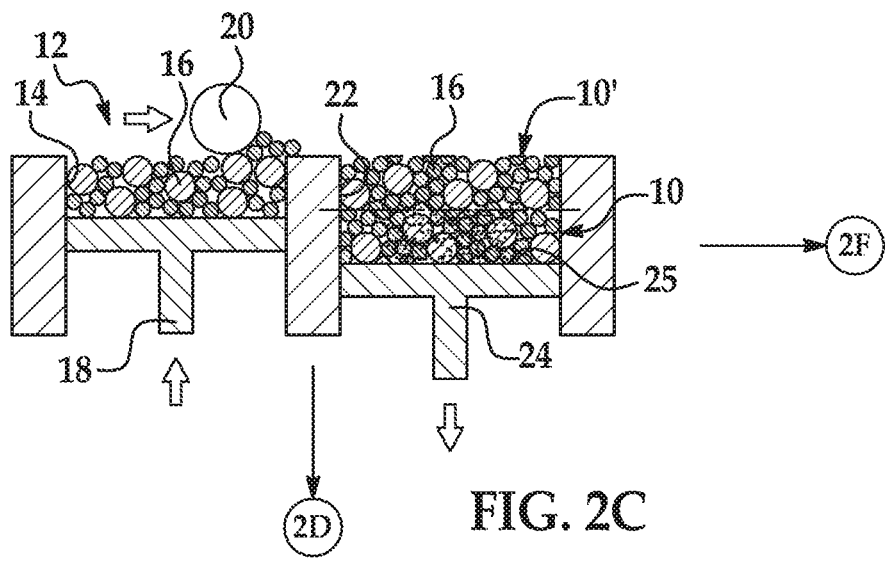

After the stabilizing liquid functional material 28 is selectively applied by the inkjet print cartridge 26 on the desired portion(s) 44 of the build material layer 10, a second layer 10" of the build material 16 may be applied to the first layer 10 of the build material 16, the latter of which is shown at reference numeral 106 in FIG. 1 and FIG. 2C. It is to be understood that the same type, size, and amount of build material 16 as previously described herein may be used to form the second layer 10'.

In one example, as shown at reference numeral 108 in FIG. 1, after the application of the second layer 10' of the build material 16, the stabilizing liquid functional material 28 may be selectively applied to at least a portion of the second layer 10'. In the example shown in FIG. 2D, the stabilizing liquid functional material 28 is applied on portion(s) 42' of the second layer 10' to pattern a perimeter of an additional layer of the 3D object to be formed. The perimeter may match a perimeter of the stabilizing liquid functional material 28 applied to the layer 10 (see, e.g., FIG. 2J), or may have any other configuration that is suitable for the additional part layer. In the example shown in FIG. 2D, the perimeter of the additional part layer is defined by selectively applying the stabilizing liquid functional material 28 onto the portions 42' of the second layer 10'. In an example, the stabilizing liquid functional material 28 may be inkjet printed in the same manner as previously described herein for FIG. 2B.

The stabilizing liquid functional material 28 effectively fills pores between the build material 16 near the surface of the portion(s) 42' of the second layer 10'. While the stabilizing liquid functional material 28 can penetrate somewhat into the depth of the layer 10', the properties of the stabilizing liquid functional material 28 may keep it from penetrating too deeply (e.g., into the build material 16 of layer 10 below layer 10').

Figure 2D:
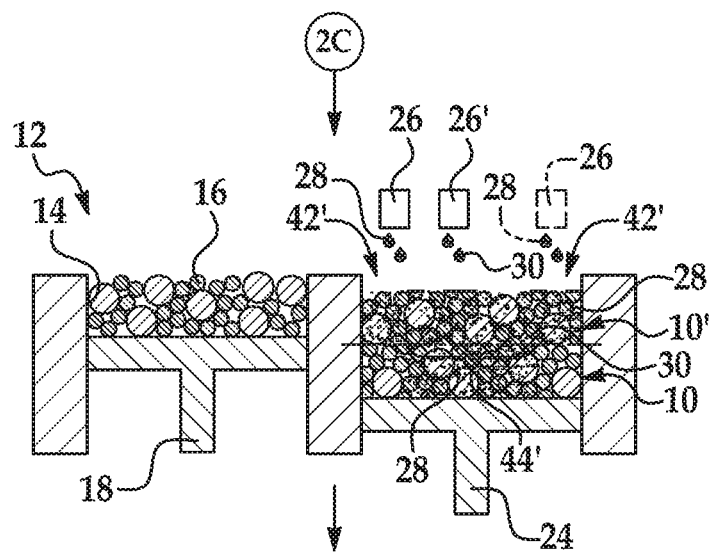

While not shown in FIG. 1, when the stabilizing liquid functional material 28 is applied to the second layer 10' to define the perimeter alone of the additional part layer that is to be formed, it may be desirable to selectively apply another liquid functional material 30 on the other portion(s) 44' of the second layer 10'. FIG. 2D depicts the selective application of the other liquid functional material 30 within the defined perimeter to pattern a remainder of the additional part layer that is to be formed. In this example, the other liquid functional material 30 may be selectively applied according to the pattern of the cross-section (which is parallel to the contact surface 25) for the interior portion of the additional part layer of the 3D object, and the stabilizing liquid functional material 28 may be selectively applied along at least part of the perimeter of that cross-section. In the example shown in FIG. 2D, the shape of the additional part layer to be formed is a rectangular prism, and the pattern of the cross-section that is parallel to the contact surface 25 is a square or rectangle having the perimeter defined by the stabilizing liquid functional material 28.

In this example, the stabilizing liquid functional material 28 is utilized to stabilize the perimeter, and the other liquid functional material 30, which may be more penetrating than the stabilizing liquid functional material 28, is utilized to achieve enhanced interlayer bonding and strengthen the mechanical properties of the 3D object. FIG. 2D depicts one example of when multiple liquid functional materials 28, 30 are utilized, and it is to be understood that the application of the other liquid functional material 30 will depend upon the configuration of the 3D object to be formed.

As noted above, the penetrating liquid functional material 30 may be added to enhance interlayer bonding and strengthen the mechanical properties of the 3D object. This may be due, in part, to the ability of the penetrating liquid functional material 30 to migrate and disperse uniformly into a layer 10, 10' of the build material 16. The penetrating liquid functional material 30 may include the same components (except the nanoparticles are referred to as first and second metal oxide nanoparticles) as previously described herein for the stabilizing liquid functional material 28. In addition, the penetrating liquid functional material 30 may have the same pH range, conductivity range, and viscosity range at the previously disclosed sheer rates and temperature as the stabilizing liquid functional material 28. The penetrating liquid functional material 30 may include a surfactant, in addition to the other components previously mentioned herein. The amounts of the components and the particle size of some of the components in the penetrating liquid functional material 30 are described in greater detail below.

The penetrating liquid functional material 30 includes the first metal oxide nanoparticle present in an amount ranging from about 0.25% to about 10% by weight based on the total weight of the penetrating liquid functional material. In an example, the first metal oxide particle may be the same type and have the same size as the first ceramic particle described herein for the stabilizing liquid functional material 28.

The penetrating liquid functional material 30 also includes the second metal oxide nanoparticle. For the penetrating liquid functional material 30, the second metal oxide nanoparticle may be any of the examples provided for the first or second ceramic nanoparticles. As an example, the second metal oxide nanoparticles in the penetrating liquid functional material 30 are discrete silica nanoparticles. In an example, the particle size of the second metal oxide nanoparticle in the penetrating liquid functional material 30 may be up to 10 nm. In an example, the particle size of the second metal oxide nanoparticles ranges from about 1 nm to about 4 nm. Unlike the second ceramic nanoparticle in the stabilizing liquid functional material 28, the second metal oxide nanoparticle may be present in the penetrating liquid functional material 30 in an amount ranging from about 5% to about 15% by weight based on the total weight of the penetrating liquid functional material 30.

The penetrating liquid functional material 30 may further include a surfactant. The amount of surfactant in the penetrating liquid functional material 30 is generally higher than the amount of surfactant (if present) in the stabilizing liquid functional material 28. The surfactant may range from about 0.1% to about 5% by weight based on the total weight of the penetrating liquid functional material 30. In another example, up to 2% of the surfactant may be present in the penetrating liquid functional material 30. Some examples of the surfactant include an ethoxylated acetylenic diol, such as SURFYNOL® 465 (commercially available from Air Products), a non-ionic surfactant commercially available under the tradename PLURONIC® P123 (BASF Corp., a difunctional block copolymer surfactant terminating in primary hydroxyl groups), a nonionic fluorosurfactant (e.g., CAPSTONE® fluorosurfactants from DuPont, previously known as ZONYL FSO), an ethoxylated low-foam wetting agent (e.g., SURFYNOL® 440 or SURFYNOL® CT-111 from Air Products and Chemical Inc.), an ethoxylated wetting agent and molecular defoamer (e.g., SURFYNOL® 420 from Air Products and Chemical Inc.), non-ionic wetting agents and molecular defoamers (e.g., SURFYNOL® 104E from Air Products and Chemical Inc.), or water-soluble, non-ionic surfactants (e.g., TERGITOL™ TMN-6 from The Dow Chemical Company).

Additionally, the same type and amounts of electromagnetic radiation absorber and organic solvents as described herein for the stabilizing liquid functional material 28 may be used for the penetrating liquid functional material 30. Furthermore, the penetrating liquid functional material 30 may be prepared in the same manner as previously described for the stabilizing liquid functional material 28. While an example of the penetrating liquid functional material 30 is disclosed herein, it is to be understood that any other liquid functional material 30 may be utilized with the stabilizing liquid functional material 28 when it (i.e., 28) is utilized to define a perimeter alone.

Still referring to FIG. 2D, in an example, the penetrating liquid functional material 30 may be applied at the same time that the stabilizing liquid functional material 28 is dispensed, using a single pass or using multiple passes. In another example, the penetrating liquid functional material 30 may be applied after the stabilizing liquid functional material 28 is dispensed to define the perimeter.

As depicted in FIG. 2D, the penetrating liquid functional material 30 may also be dispensed from an inkjet printhead 26'. While a single printhead is shown in FIG. 2D, it is to be understood that multiple printheads may be used that span the width of the fabrication bed 22. The printhead 26' may be attached to a moving XY stage or a translational carriage (neither of which is shown) that moves the printhead 26' adjacent to the fabrication bed 22 in order to deposit the penetrating liquid functional material 30. The printhead 26' may be programmed to receive commands from the central processing unit and to deposit the penetrating liquid functional material 30 in the desired portion 44'.

In the example shown in FIG. 2D, the stabilizing liquid functional material 28 applied to the portion(s) 42' of the second layer 10' is utilized to define, enhance, refine, smooth, etc. the edge(s) of the additional part layer of the 3D object that is being formed. The penetrating liquid functional material 28 applied to the remaining portion 44' of the second layer 10' penetrates the build material 16 effectively, and may penetrate or at least contact the build material 16 in the layer 10 adjacent thereto and/or the build material 16 at the perimeter (i.e., where the stabilizing liquid functional material 28 is deposited) of layer 10'. The penetration and bleed of the penetrating liquid functional material 30 across the layer(s) 10 to the layer 10' and/or across the portions 44', 42' causes interlayer bonding between the build material 16 of each layer 10, 10' and between the build material 16 at and within the perimeter of layer 10' (i.e., between portion 42' and portion 44'). It is to be understood, however, that the stabilizing liquid functional material 28 may prevent the penetrating liquid functional material 30 from migrating into the area(s) where the stabilizing liquid functional material 28 is applied.

After the stabilizing liquid functional material 28 has been applied to portion(s) 44 and/or portion(s) 42' of the two layers 10, 10' (and in some instances, after the other liquid functional material 30 has also been applied to portion(s) 44'), the layers 10, 10' of the build material 16 may be exposed to electromagnetic radiation R. This is shown at reference numeral 110 of FIG. 1 and in FIG. 2E.

The electromagnetic radiation R is emitted from an electromagnetic radiation source 31, such as, for examples, a microwave, a UV or IR curing lamp, or IR light emitting diodes (LED), halogen lamps emitting in the visible and near-IR range, or lasers suitable electromagnetic wavelengths. The electromagnetic radiation source 31 used will depend, at least in part, on the type of electromagnetic radiation absorber used in the stabilizing liquid functional material 28.

Figure 2E:
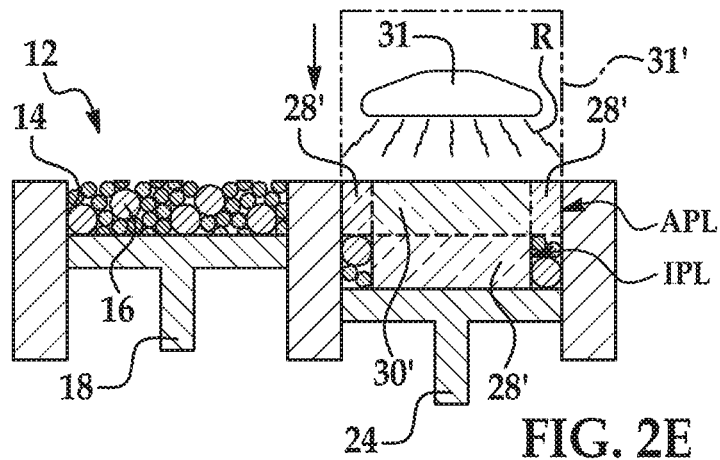

In the example shown in phantom in FIG. 2E, the electromagnetic radiation source 31' is a microwave. In this example, the build material layers 10, 10' having the liquid functional material(s) 28 or 28 and 30 thereon are removed from the fabrication bed 22 and are placed into the electromagnetic radiation source 31' (i.e., microwave), where electromagnetic radiation R exposure takes place.

In the other example depicted in FIG. 2E, the electromagnetic radiation source 31 may be attached, for example, to a carriage (not shown) that also holds the printhead(s) 26, 26'. The carriage may move the electromagnetic radiation source 31 into a position that is adjacent to the fabrication bed 22.

The electromagnetic radiation source 31, 31' may be programmed to receive commands from the central processing unit and to expose the layers 10, 10' including the stabilizing liquid functional material 28 (alone or with the other liquid functional material 30) to electromagnetic radiation R. The length of time the electromagnetic radiation R is applied for, or energy exposure time, may be dependent, for example, on one or more of: characteristics of the electromagnetic radiation source 31, 31'; characteristics of the build material 16; and/or characteristics of the stabilizing liquid functional material 28 and/or the other liquid functional material 30.

The stabilizing liquid functional material 28 (and the penetrating liquid functional material 30 when utilized) enhances the absorption of the electromagnetic radiation R, converts the absorbed radiation to thermal energy, and promotes the transfer of the thermal heat to the build material 16 in contact therewith (i.e., in the portion(s) 44, 44' and/or portion(s) 42'). In an example, the stabilizing liquid functional material 28 (and the penetrating liquid functional material 30 when utilized) sufficiently elevates the temperature of the build material 16 in the portions 44, 44' and/or portions 42' above the melting point(s), allowing curing (e.g., sintering, binding, fusing, etc.) of the build material 16 particles to take place. The electromagnetic radiation R causes the build material 16 including the stabilizing liquid functional material 28 (and the penetrating liquid functional material 30 when utilized) to at least partially fuse, In the example shown in FIG. 2E, the cured portions of the build material having had the stabilizing liquid functional material 28 thereon are shown as 28' and the cured portions of the build material having had the penetrating liquid functional material 30 thereon are shown as 30'. The initial part layer IPL is formed of cured portion(s) 28' and the additional part layer APL has a perimeter formed of cured portion(s) 28' and an interior portion formed of cured portion(s) 30'.

After electromagnetic radiation R exposure, the uncured build material 16 may be removed and the 3D object (including cured build material portions 28', 30') is formed.

Prior to performing the electromagnetic radiation R exposure, it is to be understood that reference numerals 106 and 108 of FIG. 1 may be repeated as many times as desirable to pattern additional part layers (e.g., up to "n" layers until the part shape is obtained, where n is any number) having the perimeter defined by the stabilizing liquid functional material 28, In this example of the method 100, it is to be understood that the other liquid functional material 30 may also be applied to a portion of each additional build material in order to pattern at least part of each additional part layer. As an example, the stabilizing liquid functional material 28 may be used to stabilize the perimeter of each additional part layer APL that is created, while the other liquid functional material 30 may be used to enhance interlayer bonding and 3D object strength. After a desirable number of layers 10, 10' are patterned in the shape of the 3D object, the electromagnetic radiation R exposure may be performed to simultaneously cure/fuse all of the layers 10, 10' and form the 3D object.

Another example of the method 100 disclosed herein is depicted in FIGS. 2A through 2B and FIGS. 2H through 2K. Unlike the example of method 100 shown in FIGS. 2A through 2E where all of the patterned layers are exposed to the electromagnetic radiation R simultaneously, in this example of the method 100, electromagnetic radiation R exposure takes place after each layer to be formed is defined/patterned by the selected liquid functional material(s) 28 and/or 30.

It is to be understood that FIGS. 2A-2B are the same as previously disclosed herein for reference numerals 102 through 104 in FIG. 1. The remaining FIGS. 2H through 2K will now be discussed.

Figure 2F:
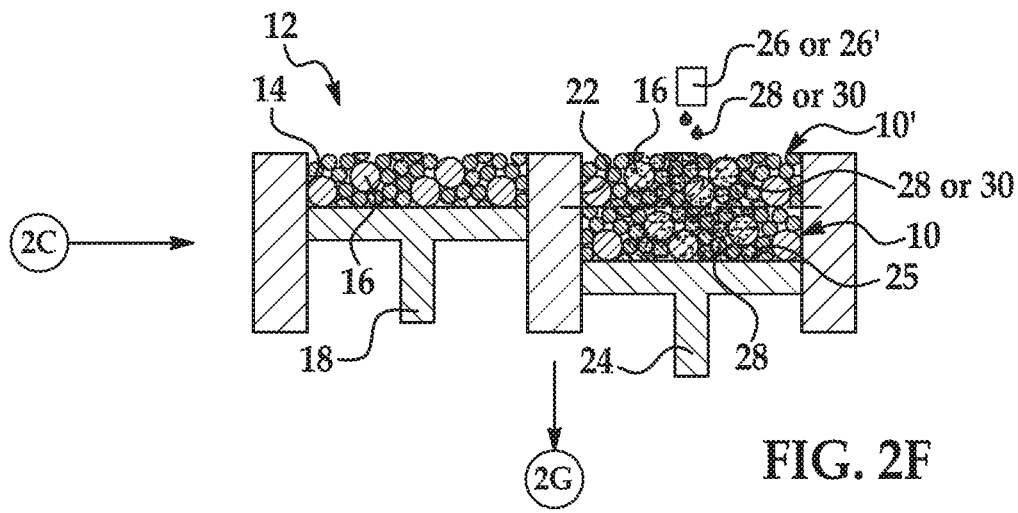
Figure 2G:
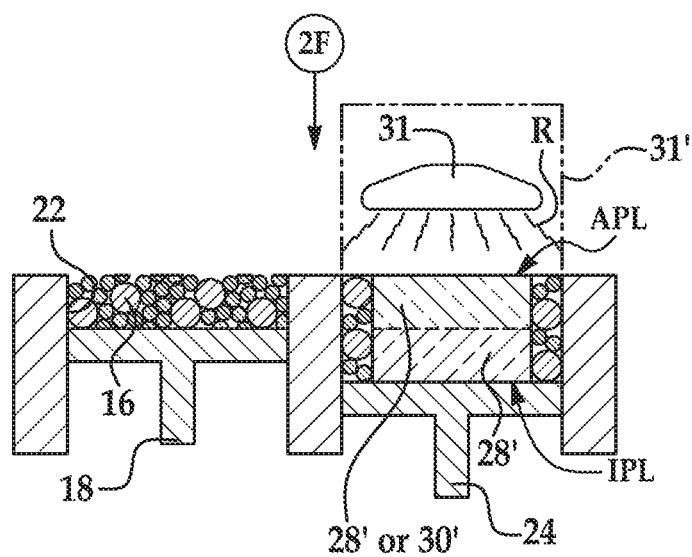
Figure 2H:
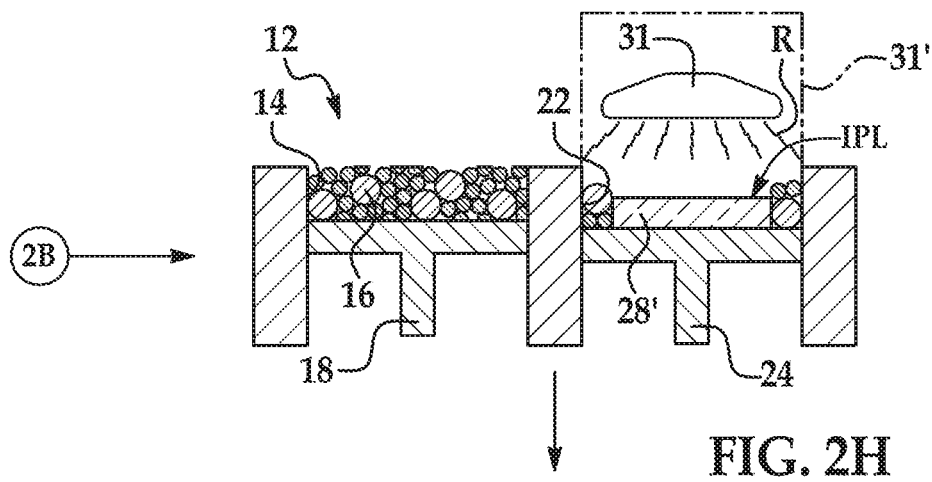

In FIG. 2H, after the stabilizing liquid functional material 28 is selectively applied on the desired portion(s) 44, the first layer 10 may be exposed to electromagnetic radiation R as previously described herein in conjunction with reference numeral 110 and FIG. 2E. The exposure of the first layer 10 to electromagnetic radiation R causes at least partial fusing of the build material 16 having the stabilizing liquid functional material 28 thereon. This results in the formation of the initial part layer IPL, which is made up of the cured portion(s) 28' of the build material having had the stabilizing liquid functional material 28 thereon.

Figure 2I:
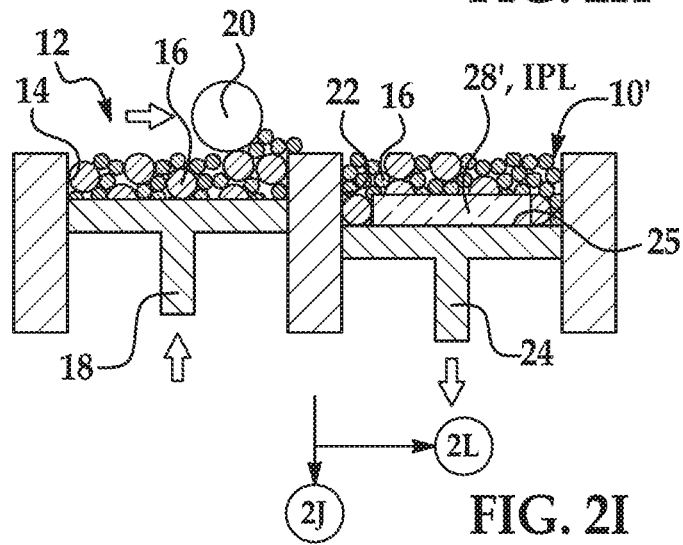

After the initial part layer IPL is formed, a second layer 10' of build material 16 may be applied, as shown in FIG. 2I. The build material 16 may be the same build material 16 and may be applied in the same manner as previously described herein for reference numeral 106 and FIG. 2C. In the example shown in FIG. 2I, however, the second build material layer 10' is applied to the initial part layer IPL, as opposed to the first build material layer 10 patterned with the stabilizing functional material 28 (as shown in FIG. 2C).

Figure 2J:
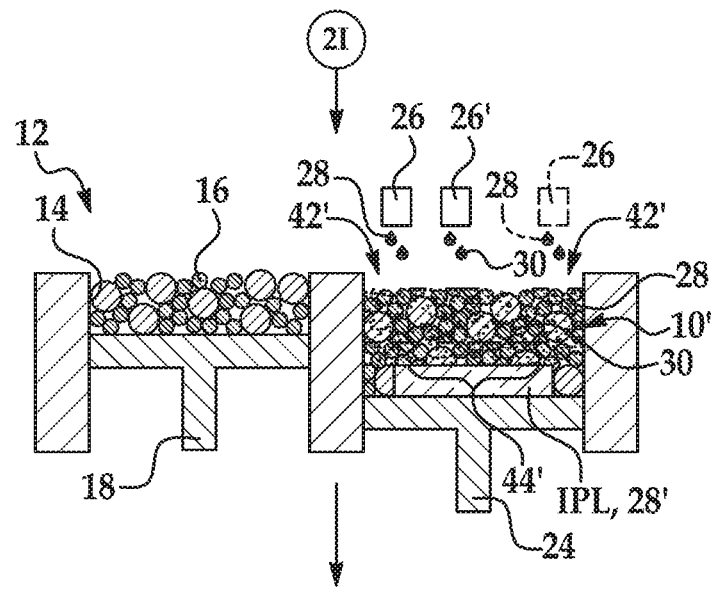

In the example shown in FIG. 2J, the stabilizing liquid functional material 28 is selectively applied on portion(s) 42' of the build material 16 in the second layer 10' to pattern the perimeter of an additional part layer that is to be formed. In this example, if it is desirable to also fuse/cure the remainder (or a portion of the remainder) of the build material 16 positioned within the defined perimeter, the other (e.g., penetrating) liquid functional material 30 may be applied to the build material of the layer 10' in order to pattern the remainder of the additional part layer that is to be formed. The functional material(s) 28, 30 may be selectively applied in a similar manner as described herein in reference to FIG. 2D.

Figure 2K:
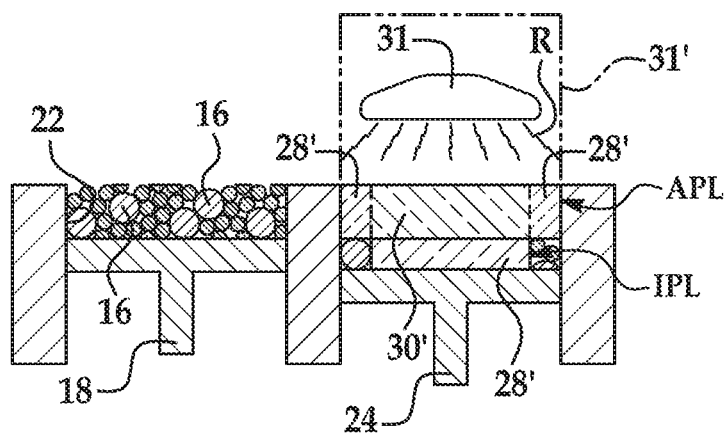

As shown in FIG. 2K, after applying the stabilizing liquid functional material 28 (and in some instances the other (e.g., penetrating) liquid functional material 30 to pattern additional part layer, the second layer 10' may be exposed to electromagnetic radiation R as previously described herein for reference numeral 110 and FIG. 2E. The exposure of the second layer 10' to electromagnetic radiation R causes at least partial fusing of the build material 16 having the stabilizing liquid functional material 28 thereon (and in some instances the build material 16 having the other liquid functional material 30 thereon). This results in the formation of the additional part layer APL on the initial part layer IPL. In the example shown in FIG. 2K, the additional part layer APL is made up of the cured portion(s) 28' of the build material having had the stabilizing liquid functional material 28 thereon, and the cured portion(s) 30' of the build material having had the other liquid functional material 30 thereon.

It is to be understood that thermal energy generated in the portion 44' and 42' during the application of the electromagnetic radiation R may propagate to a previously solidified layer, such the initial part layer IPL, causing at least some of that layer IPL to heat up above its melting point. This effect helps create strong interlayer bonding between adjacent layers of the 3D object that is formed. This effect may be further enhanced when the other, penetrating liquid functional material 30 is utilized.

In this example of the method 100, reference numerals 106 through 110 of FIG. 1 may be repeated as many times as desirable to create additional part layers APL (e.g., up to "n" layers until the part shape is obtained, where n is any number) having the perimeter defined by the stabilizing liquid functional material 28. In this example of the method 100, curing takes place after each instance of build material 16 application and patterning, and prior to the application of yet another build material layer. It is to be understood that in these examples, the other liquid functional material 30 may also be utilized to pattern at least part of each additional part layer. As an example, the stabilizing liquid functional material 28 may be used to stabilize the perimeter of each additional part layer APL that is created, while the other liquid functional material 30 may be used to enhance interlayer bonding and 3D object strength.

Figure 2L:
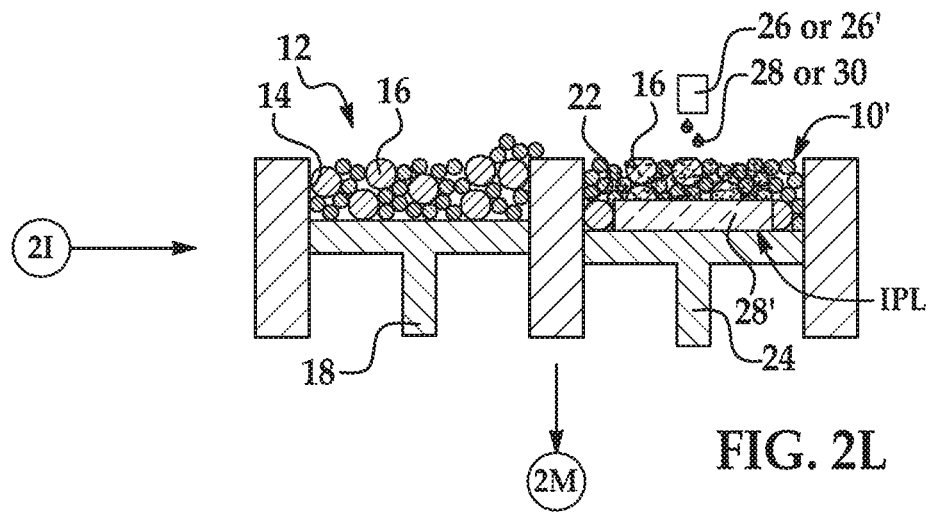
Figure 2M:
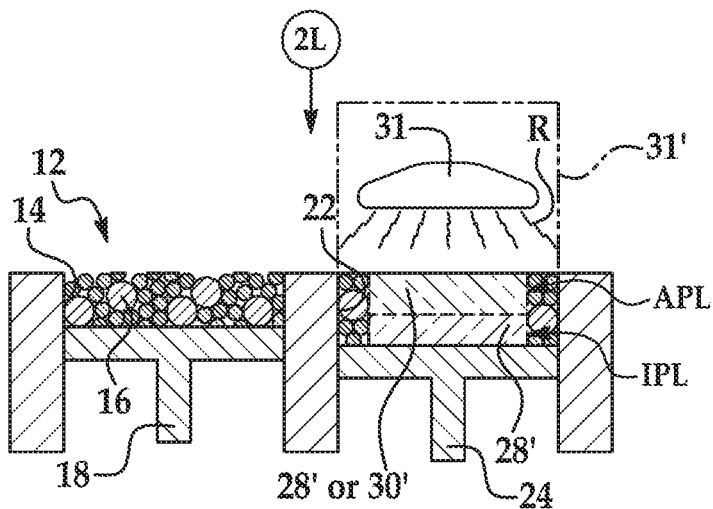
Figure 3:
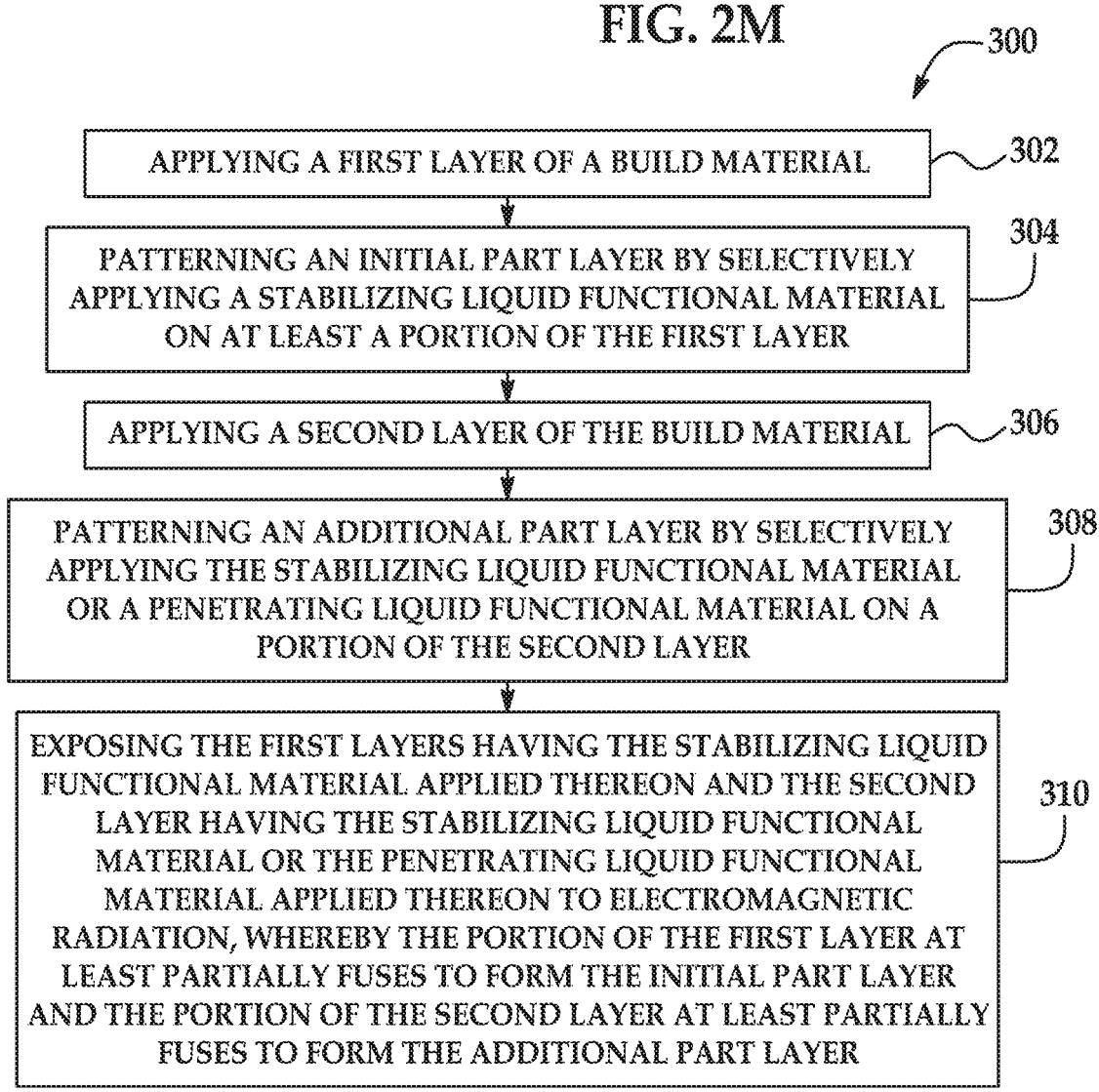
FIG. 3 is a flow diagram illustrating another example of a 3D printing method disclosed herein.

Another example of the 3D printing method 300 is depicted in FIG. 3. It is to be understood that various examples of the method 300 shown in FIG. 3 will be discussed in detail herein. In one example of the method 300 of FIG. 3, FIGS. 2A through 2C, 2F and 2G will also be described; and in another example of the method 300 of FIG. 3, FIGS. 2A, 2B, 2H, 2I, 2L and 2M will also be described.

It is to be understood that reference numerals 302 and 304 in FIG. 3 include applying a first layer 10 of the build material 16 and patterning the initial part layer by selectively applying the stabilizing liquid functional material 28 on at least a portion 44 of the first layer 10. The build material 16 application and the selective application of the stabilizing liquid functional material 28 of the method 300 are respectively described herein in reference to reference numeral 102 of FIG. 1 (and FIG. 2A) and reference numeral 104 of FIG. 1 (and FIG. 2B), and thus will not be reiterated.

In one example of the method 300, after the patterning of the initial part layer (FIG. 2B), the method includes applying a second layer 10' of the build material 16 (reference numeral 306). One example of this is shown in FIG. 2C, which has previously been described with reference numeral 106 of FIG. 1. In this example, the second layer 10' is applied to the build material layer 10 patterned with the stabilizing liquid functional material 28.

This example of the method then moves to reference numeral 308, an example of which is schematically shown in FIG. 2F. In this example of the method 300, an additional part layer is patterned by selectively applying the stabilizing liquid functional material 28 or the other liquid functional material 30 on at least a portion of the second layer 10'. In this example, the additional part layer is patterned with either the stabilizing liquid functional material 28 or the other liquid functional material 30. The selected liquid functional material 28 or 30 may be applied in a similar manner as previously described, using printhead 26 or 26'. In the example shown in FIG. 2F, the stabilizing liquid functional material 28 or the other liquid functional material 30 is applied to the build material layer 10' in a pattern that is similar to the pattern of the stabilizing liquid functional material 28 applied to the build material layer 10.

After applying the stabilizing liquid functional material 28 or the other liquid functional material 30 to pattern the additional part layer, the first and second layers 10, 10' may be simultaneously exposed to electromagnetic radiation R as previously described herein for reference numeral 110 and FIG. 2E (e.g., using source 31 or 31') This radiation R exposure is shown at reference numeral 310 of the method 300 in FIG. 3, as well as in FIG. 2G.

In one example shown in FIG. 2G, the exposure of the first and second layers 10, 10' to electromagnetic radiation R causes at least partial fusing of the build material 16 in each of the layers 10, 10' having the stabilizing liquid functional material 28 thereon. In another example shown in FIG. 2G, the exposure of the first and second layers 10, 10' to electromagnetic radiation R causes at least partial fusing of the build material 16 having the stabilizing liquid functional material 28 thereon (in layer 10) and at least partial fusing of the build material 16 having the other liquid functional material 30 thereon (in layer 10'). Either example results in the formation of the additional part layer APL on the initial part layer IPL. In one example, the additional part layer APL is made up of the cured portion(s) 28' of the build material having had the stabilizing liquid functional material 28 thereon. In another example, the additional part layer APL is made up of the cured portion(s) 30' of the build material 16 having had the other liquid functional material 30 thereon.

Prior to performing the electromagnetic radiation R exposure, it is to be understood that reference numerals 306 and 308 of FIG. 3 may be repeated as many times as desirable to pattern additional part layers (e.g., up to "n" layers until the part shape is obtained, where n is any number). After a desirable number of layers 10, 10' are patterned to define the 3D object, the electromagnetic radiation R exposure may be performed to simultaneously cure/fuse all of the layers 10, 10' and form the 3D object.

As noted above, yet another example of the method 300 is shown in FIGS. 2A, 2B, 2H, 2I, 2L and 2M. The build material 16 application and the selective application of the stabilizing liquid functional material 28 of the method 300 are respectively described herein in reference to reference numeral 102 of FIG. 1 (and FIG. 2A) and reference numeral 104 of FIG. 1 (and FIG. 2B), and thus are not reiterated. Additionally, the exposure of the first layer 10 to electromagnetic radiation R to form the initial part layer IPL (FIG. 2H) and the application of the second layer 10' of build material 16 (FIG. 2I) have also been described herein, and thus are not reiterated.

In this example of the method 300, after the application of the second layer 10' of build material 16 (FIG. 2I), the method 300 moves to reference numeral 308 and FIG. 2L. In FIG. 2L, the stabilizing liquid functional material 28 or the other liquid functional material 30 may be selectively applied to at least a portion of the second layer 10'. This patterns the additional part layer that is to be formed. In this example, the additional part layer is patterned with either the stabilizing liquid functional material 28 or the other liquid functional material 30. The selected liquid functional material 28 or 30 may be applied in a similar manner as previously described, using printhead 26 or 26'. In the example shown in FIG. 2L, the liquid functional material 28 or 30 is applied to the build material layer 10' in a pattern that is similar to the pattern of the stabilizing liquid functional material 28 applied to the build material layer 10.

After applying the stabilizing liquid functional material 28 or the other liquid functional material 30 to pattern the second layer 10', the second layer 10' may be exposed to electromagnetic radiation R as previously described herein. This radiation R exposure is shown at reference numeral 310 of the method 300 in FIG. 3, as well as in FIG. 2M. In one example shown in FIG. 2M, the exposure of the second layer 10' to electromagnetic radiation R causes at least partial fusing of the build material 16 in the second layer 10' having the stabilizing liquid functional material 28 thereon. In another example shown in FIG. 2M, the exposure of the second layer 10' to electromagnetic radiation R causes at least partial fusing of the build material 16 having the other liquid functional material 30 thereon. Either example results in the formation of the additional part layer APL on the previously solidified initial part layer IPL. In one example, the additional part layer APL is made up of the cured portion(s) 28' of the build material having had the stabilizing liquid functional material 28 thereon. In another example, the additional part layer APL is made up of the cured portion(s) 30' of the build material 16 having had the other liquid functional material 30 thereon.

It is to be understood that heat absorbed by the build material 16 during the application of energy in FIG. 2M may propagate to a previously solidified layer, such the initial part layer IPL, causing at least some of that layer IPL to heat up above its melting point. This effect helps create strong interlayer bonding between adjacent layers IPL, APL of the 3D object that is formed. This effect may be further enhanced when the other, penetrating liquid functional material 30 is utilized.

In this example of the method 300, reference numerals 306 through 310 of FIG. 3 may be repeated as many times as desirable to create additional part layers APL (e.g., up to "n" layers until the part shape is obtained, where n is any number), In this example of the method 300, curing takes place after build material 16 application and patterning and prior to the application of yet another build material layer. It is to be understood that in these examples, either the stabilizing liquid functional material 28 or the other liquid functional material 30 may also be utilized to pattern at least part of each additional part layer.

Figure 4:
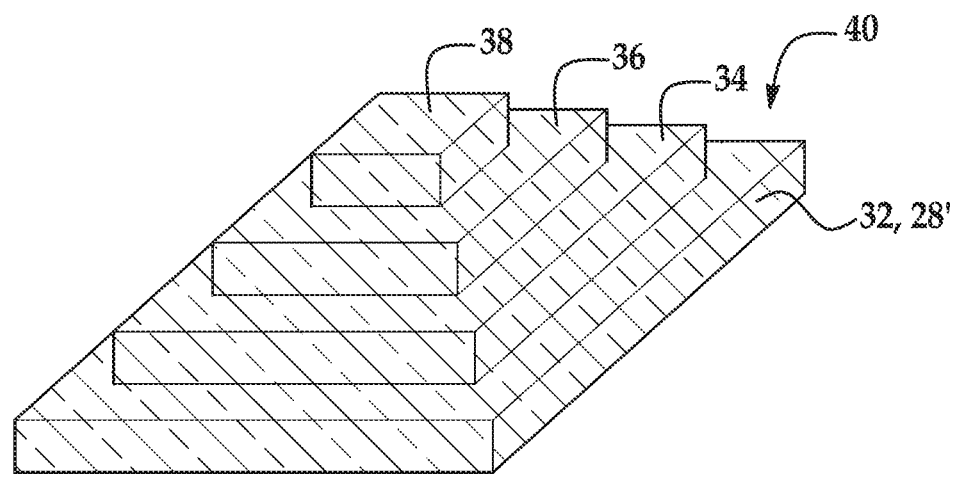
FIG. 4 is a perspective view of an example of a 3D object/part formed from the methods shown in FIGS. 2A through 2M.

An example of the 3D object or part 40 that may be formed by any of the example methods 100, 300 disclosed herein is shown in FIG. 4. The part 40 includes multiple layers 32, 34, 36, 38, It is to be understood that at least the initial part layer 32 is patterned with the stabilizing liquid functional material 28 and thus is formed of the cured portions 28' of the build material 16 having had the stabilizing liquid functional material 28 thereon. As examples, the remaining additional part layers 34, 36, 38 may be formed of cured portion 28', or of cured portion 30' (i.e., build material having had the other liquid functional material 30 thereon), or may have a perimeter formed of cured portion 28' and the remainder formed of cured portion 30'.

While one example 3D object or part 40 is shown in FIG. 4, it is to be understood that the layers 32, 34, 36, 38 may have any desirable shape and/or thickness and may be the same as or different from any other layer 32, 34, 36, 38 depending upon the size, shape, etc. of the 3D object 40 that is to be formed.

Throughout the various examples of the method 100, 300 as additional build material layer(s) 10' are formed, the delivery piston 18 is pushed closer to the opening of the delivery bed 14, and the supply of the build material 16 in the delivery bed 14 is diminished (compare, for example, FIG. 2A at the outset of the method with FIG. 2C when the second layer 10' is formed). The fabrication piston 24 is pushed further away from the opening of the fabrication bed 22 in order to accommodate the subsequent layer(s) of build material 16, the selectively applied stabilizing liquid functional material 28, and/or the selectively applied penetrating liquid functional material 30.

Additionally, during fabrication, at least some of the build material 16 may remain uncured/unfused after each layer IPL, APL (e.g., 32, 34, 36, 38) is formed (see, e.g., FIG. 2H, 2K, 2G). As such, the 3D object 40 may be at least partially surrounded by the uncured build material 16, even after it is removed from the fabrication bed 22 (e.g., placed in a microwave). When the curing of the 3D object 40 is complete, it may be removed from the fabrication bed 22 or the electromagnetic radiation source 31'. Any remaining uncured/unfused build material 16 may be removed. The uncured build material 16 may be washed and then reused.

As the layers of the 3D object 40 are built up in the Z-direction, uniformity or variations in curing/fusing/sintering may be achieved along the XY plane and/or along the Z axis. Substantially uniform curing/fusing/sintering may be achieved by applying the penetrating liquid functional material 30 within the cross-section of the pattern for each layer and applying the stabilizing liquid functional material 28 on the perimeter of each layer of the 3D object to be formed at the same voxel density, or alternatively, applying the stabilizing liquid functional material 28 on each layer of the 3D object to be formed at the same voxel density.

Figure 5:
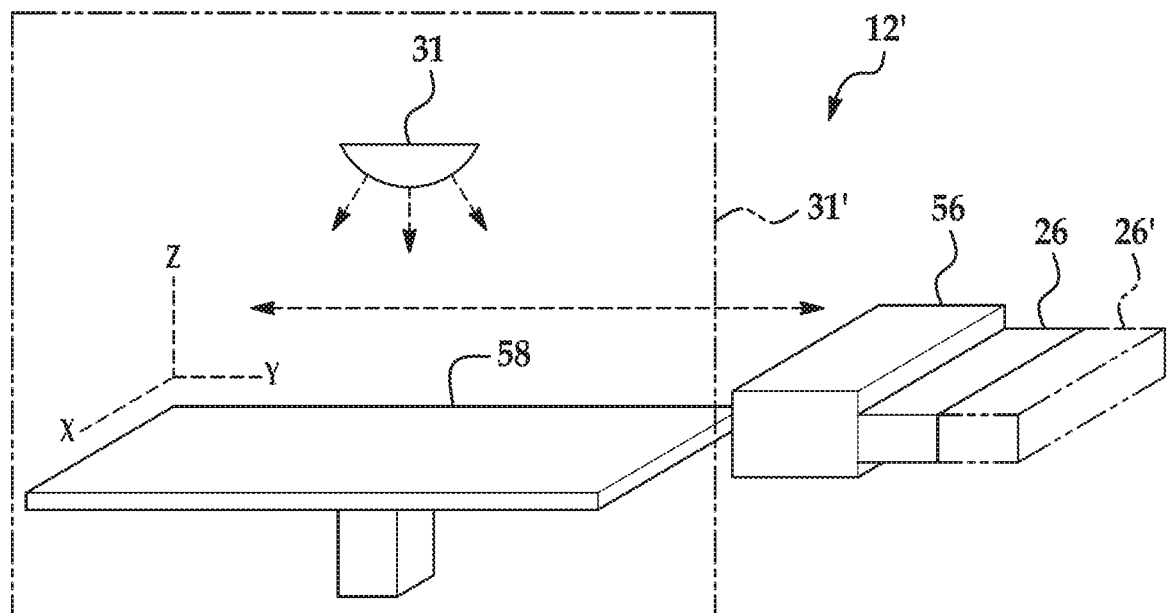
FIG. 5 is a simplified isometric view of an example of a 3D printing system that may be used in an example of the 3D printing method as disclosed herein.
Figure 5:
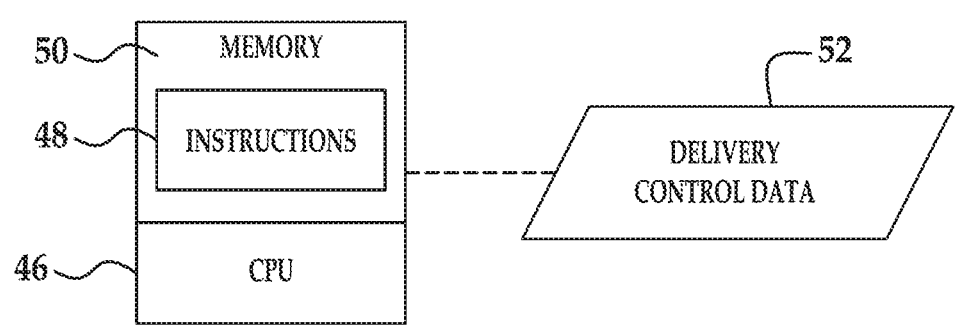

Referring now to FIG. 5, another example of the printing system 12' is depicted. The system 12' includes a central processing unit 46 that controls the general operation of the printing system 12'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 12' in accordance with the instructions 48.

In this example, the printing system 12' includes a stabilizing liquid functional material distributor 26 to selectively deliver stabilizing liquid functional material 28 to portion(s) 44, 44' and/or portion(s) 42, 42" of the layer(s) 10, 10' (not shown in this figure) of build material 16 provided on a support member 58. In this example, the printing system 12' also includes a penetrating liquid functional material distributor 26' to selectively deliver the penetrating liquid functional material 30 to the portion(s) 44' and/or 42' of the layer(s) 10' (not shown in this figure) of build material 16 provided on the support member 58.

The central processing unit 46 controls the selective delivery of the stabilizing liquid functional material 28 and the penetrating liquid functional material 30 to the layer(s) 10, 10' of the build material 16 in accordance with delivery control data 52.

In the example shown in FIG. 5, it is to be understood that the distributors 26, 26' are printheads, such as thermal printheads or piezoelectric inkjet printheads. The printheads 26, 26' may be drop-on-demand printheads or continuous drop printheads.

The printheads 26, 26' may be used to selectively deliver the stabilizing liquid functional material 28 and the penetrating liquid functional material 30, respectively, when in the form of a suitable fluid. As described above, each of the stabilizing liquid functional material 28 and the penetrating liquid functional material 30 includes an aqueous vehicle, such as water, co-solvent(s), etc to enable it to be delivered via the printheads 26, 26'.

In one example the printhead 26, 26' may be selected to deliver drops of the stabilizing liquid functional material 28 and the penetrating liquid functional material 30 at a resolution ranging from about 300 dots per inch (DPI) to about 1200 DPI. In other examples, the printhead 26, 26' may be selected to be able to deliver drops of the stabilizing liquid functional material 28 and the penetrating liquid functional material 30 at a higher or lower resolution. The drop velocity may range from about 5 m/s to about 24 m/s and the firing frequency may range from about 1 kHz to about 100 kHz.

Each printhead 26, 26' may include an array of nozzles through which the printhead 26, 26' is able to selectively eject drops of fluid. In one example, each drop may be in the order of about 10 pica liters (pl) per drop, although it is contemplated that a higher or lower drop size may be used. In some examples, printheads 26, 26' are able to deliver variable size drops.

The printheads 26, 26' may be an integral part of the printing system 12', or it may be user replaceable. When the printheads 26, 26' are user replaceable, they may be removably insertable into a suitable distributor receiver or interface module (not shown).

In another example of the printing system 12', a single inkjet printhead may be used to selectively deliver both the stabilizing liquid functional material 28 and the penetrating liquid functional material 30. For example, a first set of printhead nozzles of the printhead may be configured to deliver the stabilizing liquid functional material 28, and a second set of printhead nozzles of the printhead may be configured to deliver the penetrating liquid functional material 30.

As shown in FIG. 5, each of the distributors 26, 26' has a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 12', the distributors 26, 26' may have a shorter length that does not enable them to span the whole width of the support member 58.

While not shown in FIG. 5, it is to be understood that the distributors 26, 26' may be mounted on a moveable carriage to enable them to move bi-directionally across the length of the support member 58 along the illustrated y-axis. This enables selective delivery of the stabilizing liquid functional material 28 and the penetrating liquid functional material 30 across the whole width and length of the support member 58 in a single pass. In other examples, the distributors 26, 26' may be fixed while the support member 58 is configured to move relative thereto.

As used herein, the term 'width' generally denotes the shortest dimension in the plane parallel to the X and Y axes shown in FIG. 5, and the term 'length' denotes the longest dimension in this plane. However, it is to be understood that in other examples the term 'width' may be interchangeable with the term 'length'. As an example, the distributors 26, 26' may have a length that enables it to span the whole length of the support member 58 while the moveable carriage may move bi-directionally across the width of the support member 58.

In examples in which the distributors 26, 26' have a shorter length that does not enable them to span the whole width of the support member 58, the distributors 26, 26' may also be movable bi-directionally across the width of the support member 58 in the illustrated X axis. This configuration enables selective delivery of the stabilizing liquid functional material 28 and the penetrating liquid functional material 30 across the whole width and length of the support member 58 using multiple passes.

The distributors 26, 26' may respectively include therein a supply of the stabilizing liquid functional material 28 and the penetrating liquid functional material 30, or may be respectively operatively connected to a separate supply of the stabilizing liquid functional material 28 and penetrating liquid functional material 30.

It is to be understood that the printing system 12' may also be formed without the distributor 26' and the other, penetrating liquid functional material 30, as this fluid may not be used in forming some examples of the 3D object/part 40.

As shown in FIG. 5, the printing system 12' also includes a build material distributor 56. This distributor 56 is used to provide the layer (e.g., layer 10) of the build material 16 on the support member 58. Suitable build material distributors 56 may include, for example, a wiper blade, a roller, or combinations thereof.

The build material 16 may be supplied to the build material distributor 56 from a hopper or other suitable delivery system. In the example shown, the build material distributor 56 moves across the length (Y axis) of the support member 58 to deposit a layer of the build material

16. As previously described, a first layer of build material 16 will be deposited on the support member 58, whereas subsequent layers of the build material 16 will be deposited on a previously deposited (and solidified) layer.

It is to be further understood that the support member 58 may also be moveable along the Z axis. In an example, the support member 58 is moved in the Z direction such that as new layers of build material 16 are deposited, a predetermined gap is maintained between the surface of the most recently formed layer and the lower surface of the distributors 26, 26'. In other examples, however, the support member 58 may be fixed along the Z axis and the distributors 26, 26' may be movable along the Z axis.

Similar to the system 12, the system 12' also includes the electromagnetic radiation source 31 or 31' to apply energy to the deposited layer of build material 16, the stabilizing liquid functional material 28, and, in some instances the penetrating liquid functional material 30, to cause the solidification of, in some instances, portion(s) (e.g., 44, 44', 42') of the build material 16. Any of the previously described electromagnetic radiation sources 31, 31' may be used. In an example, the electromagnetic radiation source 31, 31' is a single energy source that is able to uniformly apply energy to the deposited materials, and in another example, the electromagnetic radiation source 31, 31' includes an array of energy sources to uniformly apply energy to the deposited materials.

In the examples disclosed herein, the electromagnetic radiation source 31, 31' is configured to apply energy in a substantially uniform manner to the whole surface of the deposited build material 16. This type of electromagnetic radiation source 31, 31' may be referred to as an unfocused energy source. Exposing the entire layer to energy simultaneously may help increase the speed at which a three-dimensional object may be generated.

While not shown, it is to be understood that the electromagnetic radiation source 31 may be mounted on the moveable carriage or may be in a fixed position.

The central processing unit 46 may control the radiation source 31, 31'. The amount of energy applied may be in accordance with delivery control data 52.

To further illustrate the present disclosure, examples are given herein. It is to be understood that these examples are provided for illustrative purposes and are not to be construed as limiting the scope of the present disclosure.

EXAMPLE

A stabilizing liquid functional material and a penetrating liquid functional material were formed.

An aqueous dispersion of the stabilizing liquid functional material was formed. The dispersion of the stabilizing liquid functional material included 10% by weight of each of sorbitol, 2-pyrrolidinone, and 2-ethyl-2-(hydroxymethyl)-1,3-propanediol (i.e., trimethylolpropane) as the organic co-solvents, 0.2% by weight of N-Cyclohexyl-2-aminoethanesulfonic acid (CHES) as the pH adjuster, 1% by weight of alumina with a particle size ranging from about 20 nm to about 30 nm, 4% by weight of ST-30LH (silica with a particle size of about 50 nm, Nissan Chemical Industries), 4% (solids) by weight of a carbon black dispersion as the electromagnetic radiation absorber, and a balance of water. The pH of the stabilizing liquid functional material was adjusted to about 10.

An aqueous dispersion of the penetrating liquid functional material was formed. The dispersion of the penetrating liquid functional material included 10% by weight of sorbitol and 12.5% by weight of 2-pyrrolidinone as the organic co-solvents, 0.2% by weight of N-Cyclohexyl-2-aminoethanesulfonic acid (CHES) as the pH adjuster, 0.25% by weight of SURFYNOL® 465 as the surfactant, 1% by weight of alumina with a particle size ranging from about 20 nm to about 30 nm and dispersed with SILQUEST® A1230, 10% by weight of SNOWTEX® ST-S (silica with a particle size of about 2 nm, Nissan Chemical Industries). 5.5% (solids) by weight of carbon black dispersion as the electromagnetic radiation absorber, and a balance of water. The pH of the stabilizing liquid functional material was adjusted to about 10.

The stabilizing and penetrating liquid functional materials where each loaded into a 12 ng per 1200 dpi pixel printhead and were respectively printed (total of 25 passes) onto an alumina powder bed including a 1:1 ratio of AKP-53 (high purity powder composed of homogeneous α-alumina crystal particles, commercially available from Sumitomo Chemical) and AA-18 (Advanced Alumina-18, commercially available from Sumitomo Chemical). The thickness of the alumina powder was about 100 μm.

After printing/patterning, the depth of the penetration of each of the stabilizing and penetrating liquid functional materials into the build material was measured. The patterned powder was cross sectioned and the penetration depth of the respective liquid functional materials was measured with a caliper.

Figure 6:
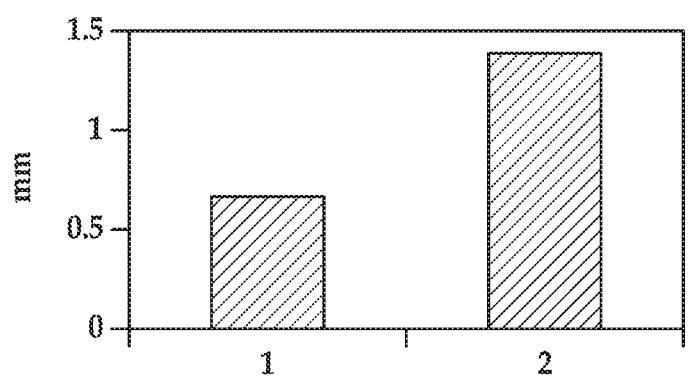
FIG. 6 is a bar graph showing the penetration depth of a stabilizing liquid functional material and a penetrating liquid functional material.

The depth measurement results are shown in FIG. 6. As depicted, the stabilizing liquid functional material (labeled 1 in FIG. 6) penetrated to a depth of 0.67 mm in the build material. It is believed that this is due, at least in part, to the larger particle size of the second ceramic nanoparticles (i.e., the silica nanoparticles) (as compared to the penetrating liquid functional material), The larger silica nanoparticles in the stabilizing liquid functional material effectively fill the voids in the build material (at and near the surface) and work to prevent the migration of pigments or other components in materials applied adjacently thereto. Also as shown in FIG. 6, the penetrating liquid functional material (labeled 2) penetrated to a depth of about 1.4 mm in the build material. It is believed this is due, in part, to the very small second metal oxide nanoparticles (i.e., the silica nanoparticles) (as compared to the stabilizing liquid functional material). The penetrating liquid functional material is thus able to more uniformly disperse throughout a layer of build material.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 2100° C. should be interpreted to include not only the explicitly recited limits of about 50° C. to about 2100° C., but also to include individual values, such as 57° C., 950° C., 1550° C., 2025° C., etc., and sub-ranges, such as from about 70° C. to about 1325° C., from about 60° C. to about 2000° C., etc. Furthermore, when "about" is utilized to describe a value, this is meant to encompass minor variations (up to +/-10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying a first layer of a build material;
   patterning an initial part layer by selectively applying, with an inkjet printhead, a stabilizing liquid functional material on at least a portion of the first layer, the stabilizing liquid functional material including:
      a first ceramic nanoparticle in an amount ranging from about 0.25% to about 5% by weight based on a total weight of the liquid functional material, wherein the first ceramic nanoparticle is selected from the group consisting of silica particles, alumina particles, zinc oxide particles, iron oxide particles, titanium oxide particles, copper oxide particles, cobalt oxide particles, indium oxide particles, zirconium oxide particles, silver oxide particles, and combinations thereof, wherein the first ceramic nanoparticle has a particle size ranging from about 5 nm to about 50 nm;
      a second ceramic nanoparticle in an amount ranging from about 0.1% to about 10% by weight based on the total weight of the liquid functional material, the second ceramic nanoparticle being different from the first ceramic nanoparticle, wherein the second ceramic nanoparticle is a discrete silica particle with a diameter ranging from about 10 nm to about 50 nm, or fibrous silica with a diameter ranging from about 10 nm to about 50 nm and a length ranging from about 50 nm to about 250 nm, or chain silica with each particle in the chain having a diameter ranging from about 10 nm to about 50 nm and a length of the chain ranging from about 100 nm to about 250 nm;
      an electromagnetic radiation absorber in an amount ranging from about 1 to about 10% by weight based on the total weight of the liquid functional material;
      an organic solvent in an amount ranging from about 5% to about 50% by weight based on the total weight of the liquid functional material; and
      a balance of water;
      wherein the stabilizing liquid functional material excludes a binder, and wherein the stabilizing liquid functional material is a non-Newtonian inkjet ink whose viscosity increases within about 1 second to about 30 seconds of exiting the inkjet printhead;
   applying a second layer of the build material;
   patterning a perimeter of an additional part layer by selectively applying the stabilizing liquid functional material on a portion of the second layer; and
   exposing the first and second layers having the stabilizing liquid functional material respectively applied thereon to electromagnetic radiation, whereby the portion of the first layer at least partially fuses to form the initial part layer and the portion of the second layer at least partially fuses to form the perimeter of the additional part layer.

2. The 3D printing method as defined in claim 1 wherein:
   prior to the exposing, the method further comprises patterning a remainder of the additional part layer by selectively applying a penetrating liquid functional material on at least an other portion of the second layer within the perimeter; and
   during the exposing, the other portion of the second layer at least partially fuses to form the remainder of the additional part layer.

3. The 3D printing method as defined in claim 2 wherein the penetrating liquid functional material includes:
   a first metal oxide particle having a particle size up to 10 nm, the first metal oxide particle present in an amount ranging from about 5% to about 15% by weight based on a total weight of the penetrating liquid functional material;
   a second metal oxide particle having a particle size ranging from about 20 nm to about 50 nm, the second metal oxide particle present in an amount ranging from about 0.25% to about 10% by weight based on the total weight of the penetrating liquid functional material;
   an electromagnetic radiation absorber in an amount ranging from about 1% to about 10% by weight based on the total weight of the penetrating liquid functional material;
   an organic solvent in an amount from about 5% to about 50% by weight based on the total weight of the penetrating liquid functional material;
   a surfactant; and
   a balance of water.

4. The 3D printing method as defined in claim 2 wherein the exposing of the first layer, having the stabilizing liquid functional material selectively applied thereon, to the electromagnetic radiation and the exposing of the second layer, having the stabilizing liquid functional material and the penetrating liquid functional material selectively applied thereon, to the electromagnetic radiation occur simultaneously.

5. The 3D printing method as defined in claim 2 wherein:
   the exposing of the first layer to the electromagnetic radiation occurs after the stabilizing liquid functional material is selectively applied thereon and before the second layer of the build material is applied; and
   the exposing of the second layer to the electromagnetic radiation occurs after the stabilizing liquid functional material and the penetrating liquid functional material are selectively applied thereon.

6. The 3D printing method as defined in claim 1 wherein the stabilizing liquid functional material has a pH ranging from about 9 to about 12 and a conductivity ranging from about 100 µS/cm to about 2000 µS/cm, and wherein the selectively applying of the stabilizing liquid functional material is accomplished via inkjet printing.

7. A three-dimensional (3D) printing method, comprising:
   applying a first layer of a build material;
   patterning an initial part layer by selectively applying a stabilizing liquid functional material on at least a portion of the first layer, the stabilizing liquid functional material including:
      a first ceramic nanoparticle in an amount ranging from about 0.25% to about 5% by weight based on a total weight of the stabilizing liquid functional material, the first ceramic nanoparticle is selected from the group consisting of silica particles, alumina particles, zinc oxide particles, iron oxide particles, titanium oxide particles, copper oxide particles, cobalt oxide particles, indium oxide particles, zirconium oxide particles, silver oxide particles, and combinations thereof, wherein the first ceramic nanoparticle has a particle size ranging from about 5 nm to about 50 nm;

second ceramic nanoparticle in an amount ranging from about 0.1% to about 10% by weight based on the total weight of the stabilizing liquid functional material, the second ceramic nanoparticle being different from the first ceramic nanoparticle, wherein the second ceramic nanoparticle is a discrete silica particle with a diameter ranging from about 10 nm to about 50 nm, or fibrous silica with a diameter ranging from about 10 nm to about 50 nm and a length ranging from about 50 nm to about 250 nm, or chain silica with each particle in the chain having a diameter ranging from about 10 nm to about 50 nm and a length of the chain ranging from about 100 nm to about 250 nm;

an electromagnetic radiation absorber in an amount ranging from about 1 to about 10% by weight based on the total weight of the stabilizing liquid functional material;

an organic solvent in an amount from about 5% to about 50% by weight based on the total weight of the stabilizing liquid functional material; and a balance of water;

wherein the stabilizing liquid functional material excludes a binder, and wherein the stabilizing liquid functional material is a non-Newtonian inkjet ink whose viscosity increases within about 1 second to about 30 seconds of exiting the inkjet printhead;

applying a second layer of the build material;

patterning an additional part layer by selectively applying the stabilizing liquid functional material or a penetrating liquid functional material on at least a portion of the second layer; and exposing the first layer having the stabilizing liquid functional material applied thereon and the second layer having the stabilizing liquid functional material or the penetrating liquid functional material applied thereon to electromagnetic radiation, whereby the portion of the first layer at least partially fuses to form the initial part layer and the portion of the second layer at least partially fuses to form the additional part layer.

8. The 3D printing method as defined in claim 7 wherein the exposing of the first layer, having the stabilizing liquid functional material applied thereon, to the electromagnetic radiation and the exposing of the second layer, having the stabilizing liquid functional material or the penetrating liquid functional material applied thereon, to the electromagnetic radiation occurs simultaneously.

9. The 3D printing method as defined in claim 7 wherein:
the exposing of the first layer to the electromagnetic radiation occurs after the stabilizing liquid functional material is selectively applied thereon and before the second layer of the build material is applied; and
the exposing of the second layer to the electromagnetic radiation occurs after the stabilizing liquid functional material or the penetrating liquid functional material is selectively applied thereon.

10. The 3D printing method as defined in claim 7 wherein the stabilizing liquid functional material has a pH ranging from about 9 to about 12 and a conductivity ranging from about 100 μS/cm to about 2000 μS/cm, and wherein the selectively applying is accomplished via inkjet printing.

11. The 3D printing method as defined in claim 7 wherein the electromagnetic radiation is selected from the group consisting of ultraviolet radiation, visible radiation, infrared radiation, microwave radiation, radio radiation, and combinations thereof.

12. The 3D printing method as defined in claim 1, wherein the stabilizing liquid functional material has a dynamic viscosity i) ranging from 5 cps to 10,000 cps at a temperature of 25° C. and a shear rate of 5 $s^{-1}$ and ii) ranging from 1 cps to 100 cps at a temperature of 25° C. and at a shear rate of 10,000 $s^{-1}$.

13. The 3D printing method as defined in claim 7, wherein the stabilizing liquid functional material has a dynamic viscosity i) ranging from 5 cps to 10,000 cps at a temperature of 25° C. and a shear rate of 5 $s^{-1}$ and ii) ranging from 1 cps to 100 cps at a temperature of 25° C. and at a shear rate of 10,000 $s^{-1}$.

* * * * *